(12) United States Patent
Abbott et al.

(10) Patent No.: US 6,920,616 B1  
(45) Date of Patent: Jul. 19, 2005

(54) INTERFACE FOR EXCHANGING CONTEXT DATA

(75) Inventors: Kenneth H. Abbott, Kirkland, WA (US); Steven J. Fluegel, Hastings, MN (US); Joshua M. Freedman, Mercer Island, WA (US); Dan Newell, Medina, WA (US); James O. Robarts, Redmond, WA (US)

(73) Assignee: Tangis Corporation, Seattle, WA (US)

( * ) Notice: Subject to any disclaimer, the term of this patent is extended or adjusted under 35 U.S.C. 154(b) by 624 days.

(21) Appl. No.: 09/692,507

(22) Filed: Oct. 19, 2000

Related U.S. Application Data

(63) Continuation-in-part of application No. 09/541,328, filed on Apr. 2, 2000, now abandoned, which is a continuation-in-part of application No. 09/541,326, filed on Apr. 2, 2000, which is a continuation-in-part of application No. 09/216,193, filed on Dec. 18, 1998, now Pat. No. 6,466,232.

(51) Int. Cl.$^7$ .................................................. G09G 5/00
(52) U.S. Cl. ..................... 715/744; 715/734; 715/748; 706/45; 706/46; 706/47; 706/61; 709/201; 709/202; 709/203
(58) Field of Search .................... 715/734–748; 709/201–203, 217–219; 707/100, 102, 6, 10; 706/45–48, 61, 60, 14; 345/733–749

(56) References Cited

U.S. PATENT DOCUMENTS

| | | | |
|---|---|---|---|
| 4,815,030 A | 3/1989 | Cross et al. | |
| 4,916,441 A | 4/1990 | Gombrich | |
| 5,032,083 A | 7/1991 | Friedman | |
| 5,201,034 A | 4/1993 | Matsuura et al. | |
| 5,208,449 A | 5/1993 | Eastman et al. | |
| 5,214,757 A | 5/1993 | Mauney et al. | |
| 5,227,614 A | 7/1993 | Danielson et al. | |
| 5,335,276 A | 8/1994 | Thompson et al. | |
| 5,416,730 A | 5/1995 | Lookofsky | |
| 5,470,233 A | 11/1995 | Fruchterman et al. | |
| 5,493,692 A | * 2/1996 | Theimer et al. | ........... 455/26.1 |
| 5,544,321 A | 8/1996 | Theimer et al. | |
| 5,555,376 A | 9/1996 | Theimer et al. | |
| 5,559,520 A | 9/1996 | Barzegar et al. | |
| 5,568,645 A | 10/1996 | Morris et al. | |
| 5,601,435 A | 2/1997 | Quy | |
| 5,603,054 A | 2/1997 | Theimer et al. | |
| 5,611,050 A | * 3/1997 | Theimer et al. | ............ 709/202 |
| 5,642,303 A | 6/1997 | Small et al. | |

(Continued)

FOREIGN PATENT DOCUMENTS

| | | |
|---|---|---|
| EP | 0 759 591 A1 | 2/1997 |
| EP | 0823 813 A2 | 2/1998 |
| EP | 0 924 615 A2 | 6/1999 |
| JP | 05260188 | 10/1993 |
| JP | 09091112 | 4/1997 |
| WO | WO 90 08361 | 7/1990 |
| WO | WO 97 03434 | 1/1997 |

OTHER PUBLICATIONS

International Search Report, Tangis Corporation, International Application No. PCT/US01/10394, Jun. 13, 2002, 5 pages.

(Continued)

*Primary Examiner*—Raymond J. Bayerl  
*Assistant Examiner*—Tadesse Hailu  
(74) *Attorney, Agent, or Firm*—Seed IP Law Group PLLC

(57) ABSTRACT

A facility for exchanging context attributes is described. A characterization module receives an invocation request to provide an attribute value that was generated by a requesting attribute consumer. The received invocation request identifies the attribute whose value is to be provided. In response to receiving the invocation request, the characterization module provides a value for the identified attribute to the requesting attribute consumer.

168 Claims, 10 Drawing Sheets

U.S. PATENT DOCUMENTS

| | | | |
|---|---|---|---|
| 5,646,629 A | | 7/1997 | Loomis et al. |
| 5,719,744 A | | 2/1998 | Jenkins et al. |
| 5,726,660 A | | 3/1998 | Purdy et al. |
| 5,751,260 A | | 5/1998 | Nappi et al. |
| 5,781,913 A | | 7/1998 | Felsenstein et al. |
| 5,790,974 A | | 8/1998 | Tognazzini |
| 5,798,733 A | | 8/1998 | Ethridge |
| 5,812,865 A | | 9/1998 | Theimer et al. |
| 5,873,070 A | | 2/1999 | Bunte et al. |
| 5,878,274 A | | 3/1999 | Kono et al. |
| 5,902,347 A | | 5/1999 | Backman et al. |
| 5,910,799 A | | 6/1999 | Carpenter et al. |
| 5,938,721 A | | 8/1999 | Dussell et al. |
| 5,948,041 A | | 9/1999 | Abo et al. |
| 5,959,611 A | | 9/1999 | Smailagic et al. |
| 5,991,687 A | | 11/1999 | Hale et al. |
| 5,999,975 A | * | 12/1999 | Kittaka et al. ............... 709/224 |
| 6,047,301 A | | 4/2000 | Bjorklund et al. |
| 6,064,943 A | | 5/2000 | Clark, Jr. et al. |
| 6,108,197 A | | 8/2000 | Janik |
| 6,127,990 A | | 10/2000 | Zwern |
| 6,195,622 B1 | * | 2/2001 | Altschuler et al. ............. 703/2 |

U.S. PATENT DOCUMENTS

"'Affective Understanding:' Modeling and Responding to User Affect," http://www.media.mit.edu/affect/AC_research understanding.html. pp. 1–3 [Accessed Oct. 2, 1998].

"Alps GlidePoint," http: www.alps.com/p17.html, p. 1 [Accessed Oct. 2, 1998].

"GyroPoint Technology," http://www.gyration.com/html/gyropoint.html, pp. 1–3 [Accessed Oct. 2, 1998].

"Haptics," http: www.ai.mit.edu/projects/handarm–haptics/haptics.html, pp. 1–2 [Accessed Oct. 2, 1998].

"Research Areas in Affective Computing," http://www.media.mit.edu/affect/, p. 1 [Accessed Oct. 2, 1998].

"Research on Affective Pattern Recognition and Modeling," http://www.media.mit.edu/affect/AC_research recognizing html, pp 1–4 [Accessed Oct. 2, 1998].

"Research on Sensing Human Affect," http: www.media.mit.edu/affect/AC_research sensing.html, pp. 1–5 [Accessed Oct. 2, 1998].

"Smart Rooms," http vismod.www.media.mit.edu.vismod demos/smartroom/, pp. 1–3 [Accessed Oct. 2, 1998].

"SmartDesk Home Page," http vismod.www.media.mit.edu.vismod/demos/smartdesk, pp. 1–4 [Accessed Oct. 2, 1998].

"The MIT Wearable Computing Web Page," http: wearables.www.media.mit.edu projects wearables, pp. 1–3 [Accessed Oct. 2, 1998].

"Wearable Computer Systems for Affective Computing," http://www.media.mit.edu affect AC research wearables html, pp 1–5 [Accessed Oct. 2, 1998].

Aoki, Hisashi et al. "Realtime Personal Positioning System for a Wearable Computer," $3^{rd}$ International Symposium on Wearable Computers, San Francisco, California, Oct. 18–19, 1999.

Bauer et al. "A Collaborative Wearable System with Remote Sensing," University of Oregon, Feb. 1996.

Billinghurst, Mark and Thad Starner, "New Ways to Manage Information," *IEEE*, pp 57–64, Jan. 1999.

Dey, Anind R et al. "The Conference Assistant: Combining Context–Awareness with Wearable Computing," $3^{rd}$ International Symposium on Wearable Computers, San Francisco, California, Oct. 18–19, 1999.

Finger et al. "Rapid Design and Manufacture of Wearable Computers." Communication of the ACM, vol. 39, No. 2, Feb. 1996. pp 63–68.

Kortuem. Gerd. "When C stures Meet Building Communities of Cooperating Wearable Agents," $3^{rd}$ International Symposium on Wearable Computers, San Frandisco, California, Oct. 18–19, 1999.

Golding, Andrew and Neal Lesh, "Indoor Navigation Using a Diverse Set of Cheap, Wearable Sensors."0 $3^{rd}$ International Symposium on Wearable Computers, San Francisco, California, Oct. 18–19, 1999.

Hull et al., "Towards Situated Computing," Hewlett–Packard Laboratories, HPI–97–66 (1997).

Bowskill, J et al. "Wearable Location Mediated Telecommunications: A First Step Towards Contextual Communication," $3^{rd}$ International Symposium on Wearable Computers, San Francisco, California, Oct. 18–19, 1999.

Yang, Jie et al . "Smart Sight A Tourist Assistant System," $3^{rd}$ International Symposium on Wearable Computers, San Francisco, California, Oct. 18–19, 1999.

Kortuem et al , "Context–Aware, Adaptive Wearable Computers as Remote Interfaces to 'Intelligent' Environments," University of Oregon, Oct. 1998.

Kirsch, Dana, "The Sentic Mouse: A tool for measuring emotional valence," http://www.media.mit.edu/affect/AC research/projects/sentic mouse.html, pp. 1–2 [Accessed Oct. 2, 1998].

Lehikoinen, Juha et al., "MEX: A Distributed Software Architecture for Wearable Computers," $3^{rd}$ International Symposium on Wearable Computers, San Francisco, California, Oct. 18–19, 1999.

Leonhardi, Alexander et al., Virtual Information Towers—A Metaphor for Intuitive, Location–Aware Information Access in a Mobile Environment, $3^{rd}$ International Symposium on Wearable Computers, San Francisco, California, Oct. 18–19, 1999.

Lunt, Teresa F. et al., "Knowledge–Based Intrusion Detection," Proceedings of the Annual Artificial Intelligence Systems in Government Conference, IEEE Comp. Soc. Press, vol. Conf. 4, 1989, pp. 102–107.

Maes, Pattic, "Agents That Reduce Work and Information Overload," Communications of the ACM, vol. 37, No. 7, Jul. 1994.

Mann, Steve, "'Smart Clothing': Wearable Multimedia Computing and 'Personal Imaging' to Restore the Technological Balance Between People and Their Environments", ACM Multimedia, Nov. 1996, pp. 163–174.

Metz, Cade, "MIT: Wearable PCs, Electronic Ink, and Smart Rooms," *PC Magazine,* pp. 192–193, Jun. 1998.

Oakes, Chris, "The Truman Show Realized?, " http://www.wired.com/news/news/technology/story/15745.html, pp. 1–4 [Accessed Oct. 21, 1998].

Picard, R.W. and Healey, J., "Affective Wearables," Personal Technologies vol. 1: 231–240, MIT Media Laboratory (1997).

Rekimoto et al., "The World through the Computer: Computer Augmented Interaction with Real World Environments," ACM. Nov. 1995, pp. 29–36.

Rhodes, Bradley, "WIMP Interface Considered Fatal," http://rhodes.www.media.mit.edu/people/rhodes/Papers/no–wimp html, pp. 1–3 [Accessed Oct. 2, 1998].

Rhodes, Bradley, J. "The Wearable Remembrance Agent: A System for Augmented Memory," Proceedings of the First International Symposium on Wearable Computers (ISWC '97), Cambridge, MA, Oct. 13–14, 1997.

Sato, J. et al., "Autonomous Behavior Control of Virtual Actors Based on the AIR Model," Proceedings Computer Animation, Jun. 5, 1997.

Schneider, Jay and Jim Suruda, "Modeling Wearable Negotiation in an Opportunistic Task Oriented Domain," $3^{rd}$ International Symposium on Wearable Computers, San Francisco, California, Oct. 18–19, 1999.

Smailagic et al., "Matching interface design with user task: Modalities of Interaction with CMU Wearable Computers," IEEE Personal Communications, Feb. 1996, pp. 14–25.

Smailagic, Asim et al., "MoCCA: A Mobile Communication and Computing Architecture," $3^{rd}$ International Symposium on Wearable Computers, San Francisco, California, Oct. 18–19, 1999.

Starner et al., "Visual Contextual Awareness in Wearable Computing," Media Lab, MIT, Oct. 1998.

Tan, Hong Z. and Alex Pentland, "Tactual Displays for Wearable Computing," *IEEE,* Massachusetts Institute of Technology Media Laboratory, pp 84–88, 1997.

Lashkari, Yezdi et al , "Collaborative Interface Agents," Proceedings of AAAI '94 Conference, Seattle, Washington, Aug. 1994.

National Instruments, "BridgeVIEW and LabVIEW G Programming Reference Manual", Jan. 1998.

National Instruments, "LabVIEW User Manual", Jan. 1998.

* cited by examiner

Fig. 4 context server table 400

| context server name | version | installation date | filename | request handler |
|---|---|---|---|---|
| gps | 1.00.315 | 2/10/2000 | gps.exe | (reference) |
| ips | 1.00.315 | 2/21/2000 | ips.exe | (reference) |
| location_region_analysis | 1.00.315 | 2/10/2000 | l_r_a.exe | (reference) |

401, 402, 403 / 411, 412, 413, 414, 415

Fig. 5 attribute instance table 500

| attribute name | context server name | value | uncertainty | timestamp | units |
|---|---|---|---|---|---|
| user.location | gps | 47°38.73' N, 122°18.43' W | 0°.09' | 13:11:04.023 2/22/2000 | degrees/minutes |
| user.location | ips | 47°38.745' N, 122°18.424' W | 0°.021' | 13:11:01.118 2/22/2000 | degrees/minutes |
| user.elevation | ips | 22 | .5 | 13:11:01.118 2/22/2000 | meters |
| user.in_region | location_region_analysis | none | none | none | none |

501, 502, 503, 504 / 511, 512, 513, 514, 515, 516 context client table ~ 600

| context client name | message handler |
|---|---|
| location_map | (reference) |
| distance_from_home | (reference) |
| region_analysis | (reference) |

601, 602, 603 — 611, 612

Fig. 6 attribute or instance registration table ~ 700

| context client name | attribute name | context server name |
|---|---|---|
| region_analysis | user.location | |
| distance_from_home | user.location | |
| location_map | user.elevation | ips |
| location_map | user.in_region | region_analysis |

Fig. 9 attribute instance table 900

| attribute name | context server name | value | uncertainty | timestamp | units | number of context clients consuming |
|---|---|---|---|---|---|---|
| user.location | gps | 47°38.73' N, 122°18.43' W | 0°.09' | 13:11:04.023 2/22/2000 | degrees/minutes | 2 |
| user.location | ips | 47°38.745' N, 122°18.424' W | 0°.021' | 13:11:01.118 2/22/2000 | degrees/minutes | 2 |
| user.elevation | ips | 22.25 | .5 | 13:11:06.565 2/22/2000 | meters | 1 |
| user.in_region | location_analysis | none | none | none | none | 1 |

901 / 902 / 903 / 904 — 911 / 912 / 913 / 914 / 915 / 916 / 919

Fig. 10 condition table 10

| condition name | context client name | first logical parameter | second logical parameter | comparison value | logical operator |
|---|---|---|---|---|---|
| in_region_true | region_analysis | user.in_region | none | TRUE | = |

1001 — 1011 / 1012 / 1013 / 1014 / 1015 / 1016

| attribute name | context server name | property name | property value |
|---|---|---|---|
| user location | ips | security_token | 5A637AR | attribute instance property table — 1400

INTERFACE FOR EXCHANGING CONTEXT DATA

CROSS-REFERENCE TO RELATED APPLICATIONS

This application is a continuation-in-part of U.S. patent application Ser. No. 09/541,328 entitled "INTERFACE FOR EXCHANGING CONTEXT DATA" filed Apr. 2, 2000 now abandon, U.S. patent application Ser. No. 09/541,326, entitled "LOGGING AND ANALYZING COMPUTER USER'S CONTEXT DATA" filed Apr. 2, 2000 and U.S. patent application Ser. No. 09/216,193, entitled "METHOD AND SYSTEM FOR CONTROLLING PRESENTATION OF INFORMATION TO A USER BASED ON THE USER'S CONDITION" filed Dec. 18, 1998 now U.S. Pat. No. 6,466,232, which are hereby incorporated by reference in their entirety.

TECHNICAL FIELD

The present invention is directed to the field of context modeling and, more particularly, to the field of data exchange for context modeling.

BACKGROUND

Wearable computers are devices that commonly serve as electronic companions and intelligent assistants to their users. A wearable computer is typically strapped to its user's body or carried by its user in a holster, and can contain a variety of both input and output devices. A wearable computer can output information to its user using, for example, display eyeglasses, audio speakers, or a tactile output device. A wearable computer can receive instructions and other input from its user via input devices such as a keyboard, various pointing devices, or an audio microphone. A wearable computer can receive information about its surroundings using sensors, such as barometric pressure and temperature sensors, global positioning system devices, or a heart rate monitor for determining the heart rate of its user and can receive additional information via communication devices, such as various types of network connections. A wearable computer can exchange information with other devices using communication schemes such as infrared communication, radio communication, or cellular modems.

Many applications for wearable computers utilize data received by the wearable computer from sensors. For example, a position mapping application for a wearable computer may utilize data received from a global positioning system device to plot its user's physical location and determine whether that position is within a special region. In this example, the global positioning system device produces data that is consumed by the position mapping application.

In conventional wearable computer systems, the position mapping application would be designed to interact directly with the global positioning system device to obtain the needed data. For example, the application may be required to instruct the device to obtain position information, retrieve the information obtained by the device, convert it to conventional latitude and longitude representation, and determine whether the represented location is within the special region.

Such direct interaction between applications and sensors to obtain and process data has significant disadvantages. First, developing an application to interact directly with a particular sensor can introduce into the application dependencies on that sensor. Accordingly, the application may need to be subsequently modified to interact successfully with alternatives to that sensor provided by other manufacturers, or even to interact successfully with future versions of the sensor from the same manufacturer.

Second, direct interaction between the application and the sensor can give rise to conflicts between multiple applications that consume the same data. For example, if the position mapping application was executing on the same wearable computer as a second application for determining the user's distance from home that also used the global positioning system device, the two applications' interactions with the device could interfere with one another.

Third, direct interaction between the application and the sensor can give rise to conflicts between multiple sensors that produce the same data. For example, if the position mapping application was executing on a wearable computer that had access to both the global positioning system device and an indoor positioning system, the application might well have trouble determining which device to use to determine the user's current position, and/or have trouble reconciling data produced by both devices.

Fourth, forming the derivation of abstract information from data observable by sensors in each application that requires the derived abstract information necessitates redundant functionality in each such application, and precludes the development of multiple competing algorithms to derive the same abstract information, rather than having to themselves process data from the sensor to derive more abstract information from data observable by sensors, it would be advantageous for applications to be able to rely on a separate programmatic entity to derive such abstract information. For example, it would be more convenient for the position mapping application to be able rely on a separate programmatic entity to determine whether the user is in a special region based upon the user's location. It would further be advantageous for such applications to share a single separate programmatic entity, rather each implementing the same derivation functionality.

Accordingly, a facility for exchanging information between sensors and applications in a wearable computer system would have significant utility.

BRIEF DESCRIPTION OF THE DRAWINGS

FIG. 4 is a data structure diagram showing a context server table that maintains a portion of the state of the characterization module.

FIG. 5 is a data structure diagram showing an attribute instance table that maintains a portion of the state of the characterization module.

FIG. 6 is a data structure diagram showing a context client table that maintains a portion of the state of the characterization module.

FIG. 7 is a data structure diagram showing an attribute or instance registration table that maintains a portion of the state of the characterization module.

FIG. 9 is a data structure diagram showing updated contents of the attribute instance table.

FIG. 10 is a data structure diagram showing a condition table that contains a portion of the state of the characterization module.

FIG. 14 is a data structure diagram showing an attribute instance property table that maintains a portion of the state of the characterization module.

DETAILED DESCRIPTION

Figure 1:
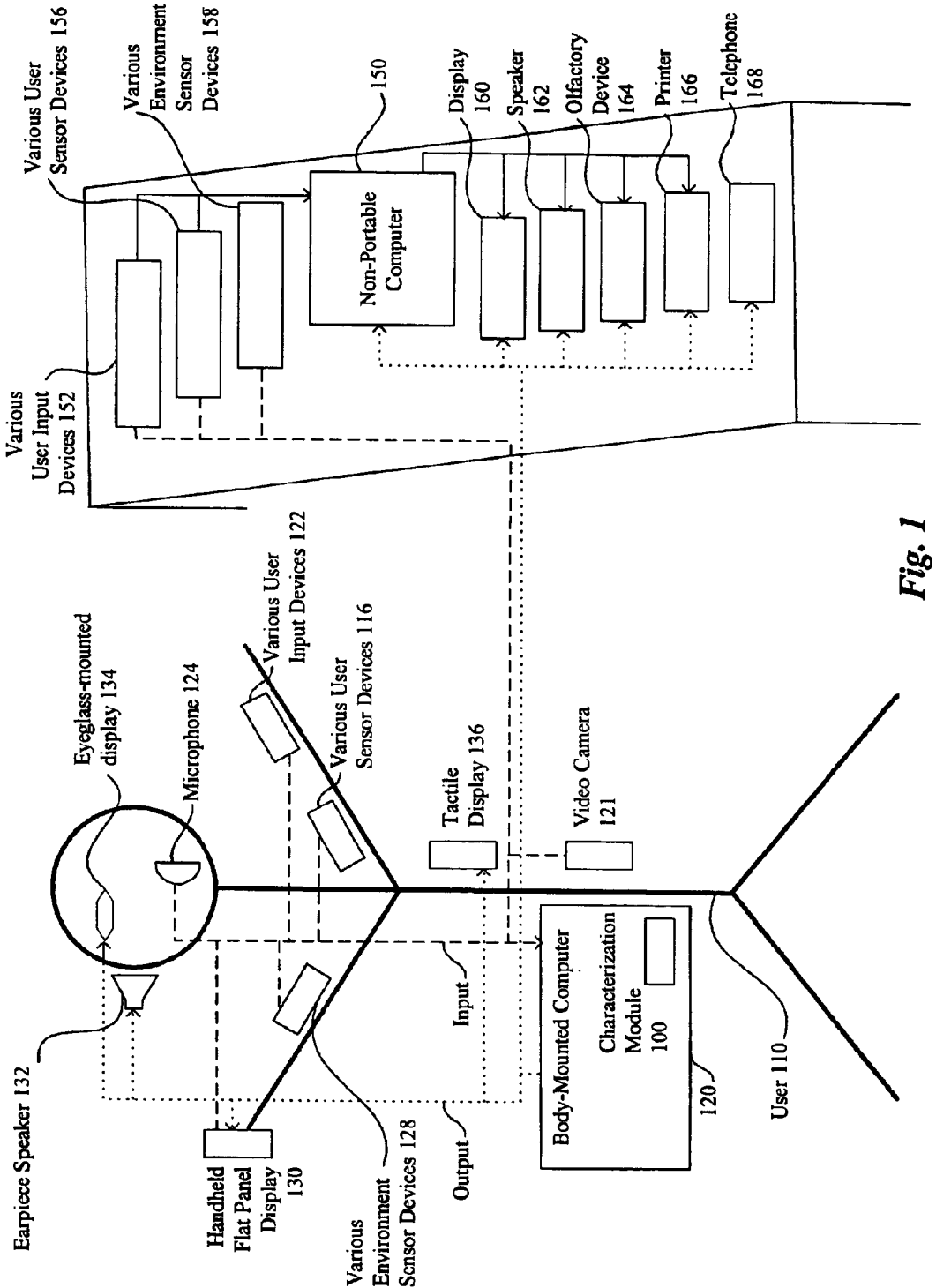
FIG. 1 illustrates an embodiment of the characterization module which executes on a general-purpose body-mounted wearable computer 120 worn by a user 110.

A software facility for exchanging information between sources of context data and consumers of context data ("the facility") is provided. In a preferred embodiment, a characterization module operating in a wearable computer system receives context information, in the form of individual attributes each modeling an aspect of the wearable computer system, its user, or the surrounding environment, from one or more context servers, and provides it to one or more context clients. The facility reduces dependencies of context client applications on specific sensors and other input devices, reduces conflicts between context client applications that consume the same context data, resolves conflicts between multiple sensors or other input devices that produce the same data, isolates the derivation of derived attributes from context client applications, and therefore obviates the redundant effort of implementing the derivation of derived attributes in each context server, and facilitates the development and use of competing algorithms to derive derived attributes.

Attributes represent measures of specific context elements such as ambient temperature, location and current user task. Each attribute preferably has the following properties: a name, a value, an uncertainty level, units, and a time stamp. Attributes provided through the characterization module by a context server may either be "measured," in that they are directly received from an input device, or "derived," in that they are the result of performing processing on values directly obtained from input devices other attributes. Indeed, a derived attribute may be produced by performing additional processing on other derived attributes. Context servers, in addition to providing attributes through the characterization module, may also provide other functions. For example, an application, such as an electronic mail application, could serve as a context server by providing attributes through the characterization module. In addition to the source of attributes described above, such an "expanded" context server may provide attributes relating to the other functions of the expanded context server. For example, an electronic mail application context server could provide an attribute indicating other new messages are waiting. Indeed, the same program module may operate both as a context client and a context server.

Two or more different context servers may preferably supply to the characterization module their own values for a single attribute. For example, a first context server can supply a value for a user.location attribute based on data received from a global positioning system device, while a second context server can supply a value for the user.location attribute based on data received from an indoor positioning device. These separate values for the same attribute are referred to as separate "instances" of the attribute. The characterization module preferably provides a variety of different approaches, called "mediators," for determining, when an attribute requested by a context client has more than one instance, what attribute value to provide in response to the attribute request.

When the characterization module obtains an attribute value from a context server, it preferably caches it for responding to future requests for the attribute from context clients. Such attribute requests may specify a specific instance of the attribute—that is, a specific context server from which the attribute is to be obtained—may specify that the attribute is to be obtained by applying a particular mediator to whatever instances of the attribute are available, or may utilize a default mediator to mediate between available instances of the attribute. When the characterization module receives an attribute request from a context client, it identifies the attribute instances available to satisfy the request, and, or each, determines whether the value for the attribute instance cached by the characterization module was obtained sufficiently recently from the corresponding context server. If not, the characterization module requests an updated value for the attribute instance from the corresponding context server before performing any necessary mediation and returning a value to the context client.

Context servers and context clients preferably interact with the characterization module by calling functions provided by the characterization module. These functions are said to collectively comprise an "application programming interface" (or "API") to the characterization module.

A context client that seeks to request a particular attribute or attribute instance may call a LaunchContextServer function to launch a particular context server that is not executing. Each executing context server preferably registers with the characterization module by calling a RegisterContextServer function, identifying itself. The context server goes on to make an instance of an attribute available to context clients via the characterization module by following a CreateAttributeInstance function. A particular context server may preferably provide a number of different attributes by calling the CreateAttributeInstance function multiple times. Before seeking to consume an attribute, a context client calls a RegisterContextClient function, identifying itself. In order to consume an attribute, a context client calls a RegisterToConsumeAttributeOrInstance function, identifying itself and an attribute that it seeks to consume. To help determine which attributes to consume, a context client may call a EnumerateAttributes function to obtain a list of the attributes available from the characterization module. In order to actually retrieve an attribute value, a context client calls a GetAttribute function, identifying the attribute and any attribute processing that should be applied, such as a specific type of mediation between different instances of the attribute obtained from different context servers. For attributes that have multiple instances in the characterization module, a context client may call a GetAllAttributeInstances function to obtain a value of the attribute for each attribute instance. To force a particular context server to reevaluate all of its attribute instances, a context client may call a CompleteContextServerEvaluation function. Also, to retrieve attributes reflecting aspects of the configuration of the characterization module, a context client or other program may call a GetCharacterizationModuleAttribute function. A context client that consumes a particular attribute may create a condition in the characterization module that tests that attribute by calling a CreateCondition function. Once a context client has created a condition, it can evaluate the condition by calling an EvaluateCondition function, identifying the condition. Once a context client has created a condition, it may go on to call a CreateConditionMonitor function to create a condition monitor that monitors the condition and notifies the context server when the condition is satisfied. To suspend operation of a created condition monitor, a context server may call a StopConditionMonitor function, and to resume its operation, may call a StartConditionMonitor function. The context server may remove a condition monitor that it created by calling a RemoveConditionMonitor function, and, correspondingly, may remove a condition that it created by calling a RemoveCondition function. A context client may unregister to consume a particular attribute by calling an UnregisterToConsumeAttributeOrInstance function. A context client may unregister itself with the characterization module by calling an UnregisterContextClient function. A context server may—though need not—remove attribute instances that it has registered by calling a RemoveAttributeInstance function. Before it does, however, it may—though need not—first call a CheckAttributeInstanceDependencies function to determine whether any context clients currently depend upon that attribute instance. Once it has removed its attribute instances, a context server may unregister with the characterization module by calling an UnregisterContextServer function. These API functions are discussed in greater detail below in conjunction with an example.

FIG. 1 illustrates an embodiment of the characterization module which executes on a general-purpose body-mounted wearable computer 120 worn by a user 110. Many wearable computers are designed to act as constant companions and intelligent assistants to a user, and are often strapped to a user's body or mounted in a holster. The computer system may also be incorporated in the user's clothing, be implanted in the user, follow the user, or otherwise remain in the user's presence. In one preferred embodiment the user is human, but in additional preferred embodiments, the user may be an animal, a robot, a car, a bus, or another entity whose context data is to be processed. Indeed, the computer system may have no identifiable user, but rather operate as an independent probe, processing context data in an arbitrary location. The wearable computer 120 has a variety of user-worn user input devices including a microphone 124, a hand-held flat panel display 130 with character recognition capabilities, and various other user input devices 122. Similarly, the computer has a variety of user-worn output devices that include the hand-held flat panel display, an earpiece speaker 132, an eyeglass-mounted display 134, and a tactile display 136. In addition to the various user-worn user input devices, the computer can also receive information from various user sensor input devices 116 and from environment sensor input devices 128, including video camera 121. The characterization module can receive and process the various input information received by the computer, such as from context servers that process the input information and generate attribute values, and can present information to the user on the various output devices accessible to the computer.

In the current environment, computer 120 is accessible to a computer 150 (e.g., by being in line-of-sight wireless proximity or by being reachable via a long-distance communication device such as a cellular phone) which also has a variety of input and output devices. In the illustrated embodiment the computer 150 is non-portable, although the body-mounted computer of the user can similarly communicate with a variety of other types of computers, including body-mounted computers of other users. The devices from which the non-portable computer can directly receive information include various user input devices 152 and various user sensor input devices 156. The non-portable computer can output information directly to a display 160, a speaker 162, an olfactory device 164, and a printer 166. In the illustrated embodiment, the body-mounted computer can communicate with the non-portable computer via a wireless transmission medium. In this manner, the characterization module can receive information from the user input devices 152 and the user sensor devices 156 after the information has been transmitted to the non-portable computer and then to the body-mounted computer. Alternately, the body-mounted computer may be able to directly communicate with the user input devices 152 and the user sensor devices 156, as well as with other various remote environment sensor input devices 158, without the intervention of the non-portable computer 150. Similarly, the body-mounted computer may be able to supply output information to the display 160, the speaker 162, the olfactory device 164, and the printer 166, either directly or via the non-portable computer, and directly to the telephone 168. As the user moves out of range of the remote input and output devices, the characterization module will be updated to reflect that remote devices are not currently available.

The various input devices allow the characterization module or an application such as a context server (not shown) executing on the computer system 120 to monitor the user and the environment and to model their current condition. Such a model can be used by various applications, such as context clients, for various purposes. A model of the current conditions can include a variety of condition variables that represent information about the user, the computer, and the user's environment at varying levels of abstraction. For example, information about the user at a low level of abstraction can include raw physiological data (e.g., heart rate and EKG) and geographic information (e.g., location and speed), while higher levels of abstraction may attempt to characterize or predict the user's physical activity (e.g., jogging or talking on a phone), emotional state (e.g., angry or puzzled), desired output behavior for different types of information (e.g., to present private family information so that it is perceivable only to myself and my family members), and cognitive load (i.e., the amount of attention required for the user's current activities). Background information which changes rarely or not at all can also be included, such as the user's age, gender and visual acuity. The model can similarly hold environment information at a low level of abstraction, such as air temperature or raw data from a motion sensor, or at higher levels of abstraction, such as the number and identities of nearby people, objects, and locations. The model of the current conditions can additionally include information added explicitly from other sources (e.g., application programs), as well as user-specified or system-learned defaults and preference information.

Those skilled in the art will appreciate that computer systems 120 and 150, as well as their various input and output devices, are merely illustrative and are not intended to limit the scope of the present invention. The computer systems may contain additional components or may lack some illustrated components. For example, it is possible that the characterization module can be implemented on the non-portable computer, with the body-mounted computer replaced by a thin context client such as a transmitter/receiver for relaying information between the body-mounted input and output devices and the non-portable computer. Alternately, the user may not wear any devices or computers.

In addition, the body-mounted computer may connected to one or more networks of other devices through wired or wireless communication means (e.g., wireless RF, a cellular phone or modem, infrared, physical cable, a docking station, etc.), either with or without support from other computers such as the computer 150. For example, the body-mounted computer of a user can make use of output devices in a smart room, such as a television and stereo when the user is at home, if the body-mounted computer can transmit information to those devices via a wireless medium or if a cabled or docking mechanism is available. Alternately, kiosks or other information devices can be installed at various locations (e.g., in airports or at tourist spots) to transmit relevant information to body-mounted computers within the range of the information device.

Those skilled in the art will also appreciate that specialized versions of the body-mounted computer and characterization module can be created for a variety of purposes.

Figure 2:
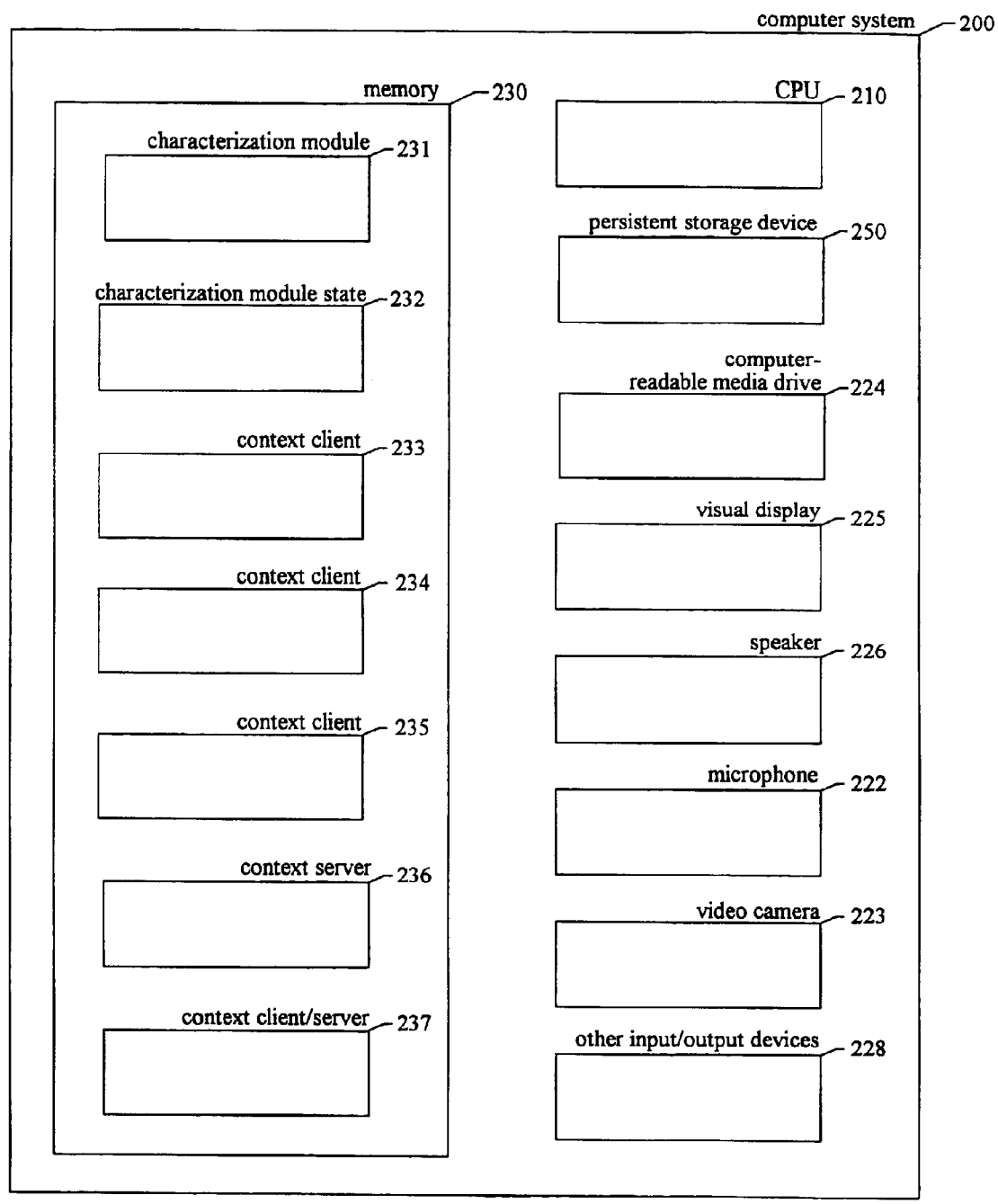
FIG. 2 illustrates an exemplary computer system 200 on which an embodiment of the characterization module is executing.

FIG. 2 illustrates an exemplary computer system 200 on which an embodiment of the characterization module is executing. The computer includes a memory 230, a CPU 210, a persistent storage device 250 such as a hard drive, and input/output devices including a microphone 222, a video camera 223, a computer-readable media drive 224, such as a CD-ROM drive, a visual display 225, a speaker 226, and other devices 228. The memory preferably includes the characterization module 231, as well as information reflecting the current state of the characterization module (characterization module state) 232. The memory further contains software modules 233, 234, and 237 that consume attributes and are therefore context clients, and software modules 235, 236, and 237 which provide attributes and are therefore context servers. While items 231–237 are preferably stored in memory while being used, those skilled in the art will appreciate that these items, or portions of them, can be transferred between memory and the persistent storage device for purposes of memory management and data integrity.

The facility preferably utilizes a plain-language, hierarchical, taxonometric attribute nomenclature to name attributes. The attribute names within the nomenclature are preferably specific so that there is no ambiguity as to what they represent. The facility preferably supports the extension of the nomenclature by adding new attribute names that conform to the hierarchical taxonomy of the nomenclature. The nomenclature preferably has attribute names relating to the user, such as user.position, user.speed, and user.direction, providing information about the user's position, speed, and direction, respectively. The nomenclature preferably contains attribute names for various user moods, such as user.mood.happiness, user.mood.anger, and user.mood.confusion. The nomenclature preferably includes attribute names for user activities, such as user.activity.driving, user.activity.eating, and user.activity.sleeping. The nomenclature preferably includes attribute names for user physiology values, such as user.physiology.pulse, user.physiology.body_temperature, and user.physiology.blood_pressure. The nomenclature preferably includes attribute names for similar attributes of people other than the user, such as person.John_Smith.mood.happiness. The nomenclature preferably includes attribute names for aspects of the computer system or "platform." For example, the nomenclature preferably includes attribute names for aspects of the platform's user interface, such as platform.user_interface.oral_input_device_availability and platform.user_interface.visual_output_device_availability. The nomenclature preferably includes attribute names for attributes relating to the central processing unit, or "CPU," of the platform, such as platform.cpu_load and platform.clock_speed. The nomenclature preferably also provides attribute names for aspects of the local environment, such as environment.local.time, environment.local.temperature, and environment.local.ambient_noise_level. The nomenclature preferably also includes attribute names for remote environments, such as environment.place.chicago.time and environment.place.san_diego.temperature. The nomenclature preferably further provides attribute names relating to specific applications. For example, the nomenclature preferably provides attribute names for aspects of an electronic mail application, such as application.mail.available, application.mail.new_messages_waiting, and application.mail.messages waiting_to_be_sent. In this manner, the attribute nomenclature used by the facility provides effective names for attributes relating to the user, the computer system, and the environment.

Figure 3:
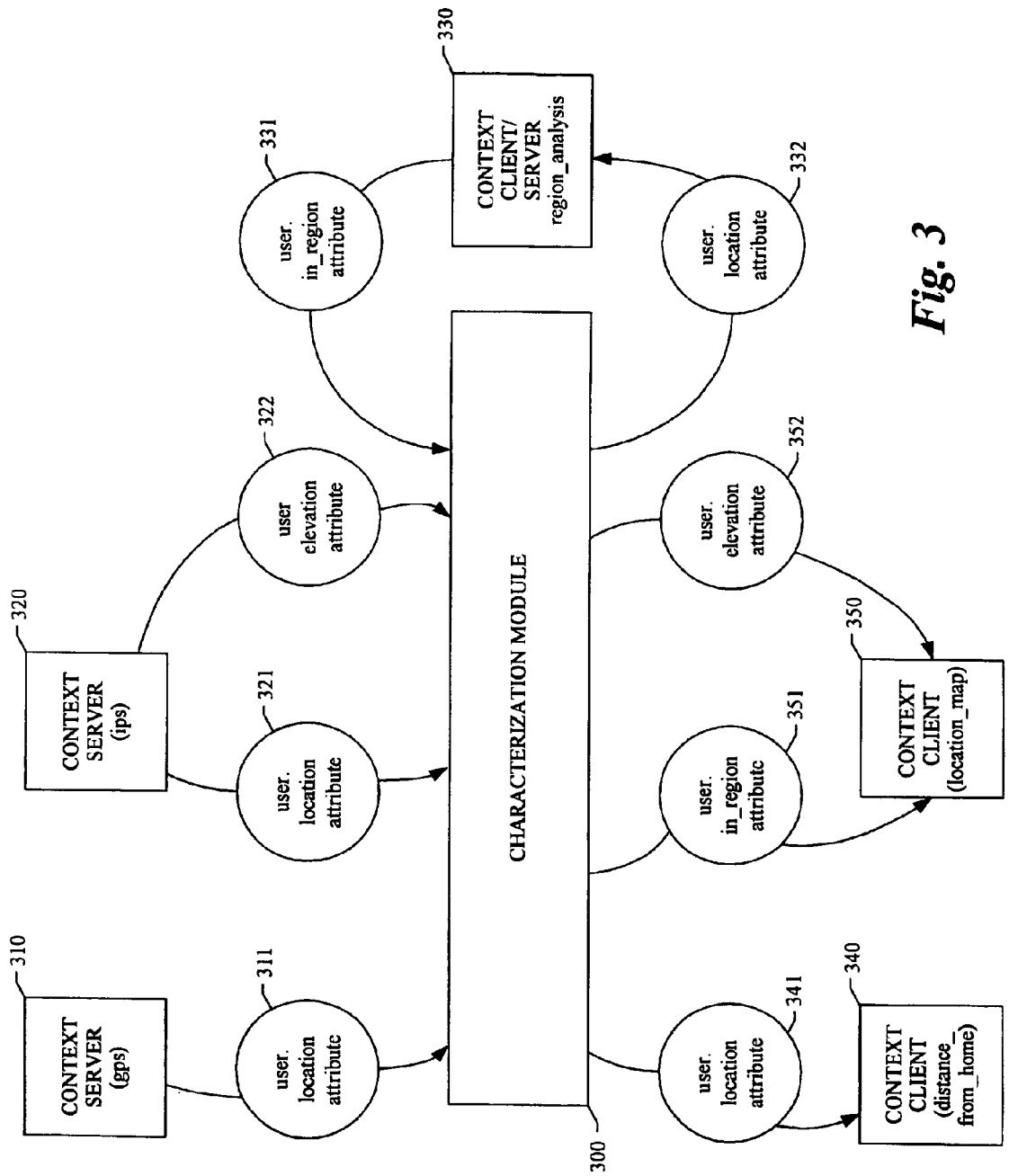
FIG. 3 is a data flow diagram showing a sample exchange of attributes performed by the characterization module.

FIG. 3 is a data flow diagram showing a sample exchange of attributes performed by the characterization module. The diagram shows characterization module 300, as well as five other software modules, 310, 320, 330, 340, and 350. Software modules 310, 320, and 330 are said to be context servers, in that they provide attributes to the characterization module. For example, context server 330 provides an user.in_region attribute 331. It can be seen that context servers may provide more than one attribute. For example, context server 320 provides a user.location attribute 321 and an user.elevation attribute 322. It can further be seen that a single attribute may be provided by more than one context server. For example, context server 310 provides user.location attribute 311, while context server 320 provides user.location attribute 321. The characterization module preferably provides functionality for mediating between these two separate instances of a user.location attribute when the user.location attribute is requested by a context client.

Software modules 330, 340, and 350 are said to be context clients because they consume attributes. For example, context client 340 consumes user.location attribute 341. It can be seen that certain software modules may act both as a context server and as a context client. For example, software module 330 is both a context server and a context client, as it provides the user.in_region attribute 331, as well as consuming a user.location attribute 332. It can also be seen that a context client consumes more than one attribute. For example, context client 350 consumes both user.in_region attribute 351 and user.elevation attribute 352. To determine which attributes are currently available, any of the context clients may request that the characterization module enumerate the available attributes. In response to such a request, the characterization module would enumerate the user.location attribute, the user.location attribute, and the user.in_region attribute. Additional preferred embodiments permit context clients to otherwise limit attribute enumeration requests. For example, a context client may request enumeration of all user interface attributes by specifying the wildcard-expanded attribute name platform.user_interface.*.

The characterization module preferably implements the API functions described in detail below in order to obtain attribute values from context servers and provide them to context clients. While these functions are preferably exposed via Microsoft Component Object Module ("COM") interfaces, those skilled in the art will appreciate that they could be made available to context servers and context clients through a variety of other mechanisms, including a number of different function-calling and message-passing invocation schemes.

LaunchContextServer

Any application can launch a context server that is not already running by calling this function, passing the following parameter:

Context Server Identifier—A filename, COM object, or other identification method that unambiguously identifies the context server and exposes a mechanism for launching it.

This function returns an error if the requested context server is not found, and returns an error if the requested context server is already running.

Each context server has an associated startup behavior, which specifies whether or not the context server is automatically launched when the characterization module launches. Context servers installation application or the characterization module's control panel applet may be used to change the startup behavior.

RegisterContextServer

When a context server launches, it calls this function to notify the characterization module of its intent to provide attribute instances, passing the following parameters:

Context Server Name—A name that conforms to attribute naming specifications and uniquely identifies the context server.

Version—A floating point number that corresponds to the version of the context server.

Installation Date—The date and time that the context server was installed.

Filename—The context server's main filename expressed as an absolute pathname.

Request Handler—A reference to a context server interface that accepts messages from the characterization module to the context server. This information is not available to external modules.

If the registration request includes a context server name that is already in use, the characterization module returns an error and does not register the context server.

FIG. 4 is a data structure diagram showing a context server table that maintains a portion of the state of the characterization module. When the RegisterContextServer function is called, the characterization module preferably adds a row to the context server table corresponding to the registered context server. The context server table 400 contains rows 401–403, each corresponding to a registered context server. Each row contains a context server name field 411 containing the name of the context server, a version field 412 identifying the version of the context server, an installation date 413 identifying the date on which the context server was installed on the computer system, a filename 414 identifying a primary file in the file system representing the context server, and a request handler field 415 containing a reference to a request handler function on the context server that may be called by the characterization module to request evaluation of one or all of the attributes provided by the context server. The characterization module preferably adds a row to the context server table when the LaunchContextServer function is called. For example, when the location__region__analysis context server calls the LaunchContextServer function, the characterization module preferably adds row 403 to the context server table. The contents of row 403 indicate that version 1.00.315 of the location__region__analysis context server, installed on Feb. 10, 2000 and having file name l__r__a.exe is registered with the request handler referenced in the request handler field 415 of row 403.

CreateAttributeInstance

Context servers may create an attribute instance at any time by calling this function, passing the following parameters:

Context Server Name—A name that is unique to the requesting context server. This name should be the same for all attributes that the context server creates. In some embodiments, this parameter is implicit in each call to this function, and need not be explicitly passed.

Attribute Name—The name of the attribute.

Data Type—The type of data in which the attribute's value and uncertainty are expressed.

Format Version—The number of the format version in which the value is expressed.

Request Handler—A reference to the context server function that processes attribute requests from the characterization module. The characterization module may also send messages to the context server via this function. A single request handler may be used for multiple attributes. In an alternative embodiment, the Request Handler parameter may be specified only during context server registration, rather than during attribute instance creation, or during either activity.

Startup Behavior—Specifies whether or not the context server should be loaded automatically at startup. This parameter is optional. If included, it supercedes any previous setting for the requesting context server. If the startup behavior is never specified, the characterization module is not responsible for launching the context server. In an alternative embodiment, the Startup Behavior parameter may be specified only during context server registration, rather than during attribute instance creation, or during either activity.

This function returns an error if the name matches that of an attribute that the context server has already created. If another instance of the attribute already exists and has the same format version, this function returns an error if the data type does not match that of the existing attribute.

FIG. 5 is a data structure diagram showing an attribute instance table that maintains a portion of the state of the characterization module. The attribute instance table contains a row for each attribute instance created by a context server. When a context server calls the CreateAttributeInstance function, the characterization module preferably adds a row to the attribute instance table. The attribute instance table 500 contains rows 501–504, each corresponding to a different attribute instance. Each of these rows contains the following fields: an attribute name field 511 containing the name of the attribute, a context server name field 512 identifying the context server that created the attribute instance, a value field 513 containing the value of the attribute last provided by the context server, and uncertainty field 514 identifying the level of uncertainty of the value, a timestamp 515 indicating the time at which the value is effective, and a units field 516 identifying the units for the value and the uncertainty. For example, row 501 indicates that an instance of the user.location attribute from the gps context server has the effective time of 13:11:04.023 on Feb. 22, 2000. Its value is 47° 36.73' N, 122° 18.43' W degrees and minutes, with an uncertainty of 0°0.09'. It should be noted, as shown, the user's location, expressed in terms of latitude and longitude, is maintained in a single attribute. In alternative embodiments, such a location could be maintained in a larger number of attributes. For example, rather than being maintained in a single user.location attribute, such a location could be distributed across four separate attributes: user.location.latitude.degrees, user.location.latitude.minutes, user.location.longitude.degrees, and user.location.longitude.minutes. The characterization module preferably adds row 504 to the attribute instance table when the location_region_analysis context server calls the CreateAttributeInstance function for the user.in_region attribute.

RegisterContextClient

Each context client registers with the characterization module, passing the following parameters:

Name—A name for the context client used for all attribute registrations for a particular context client. If the context client also acts as a context server, it preferably uses the identical name for context server registration, though may use a different name.

Message Handler—A reference to a context client function that processes messages from the characterization module, such as notifications that attributes are destroyed or the characterization module is shutting down.

The first time a context client registers, it provides a non-null message handler. Subsequent calls by that context client may provide a new message handler that replaces the previous one.

FIG. 6 is a data structure diagram showing a context client table that maintains a portion of the state of the characterization module. The context client table 600 contains rows 601–603, each corresponding to a registered context client. Each row contains a context client name field 611 identifying the name of the registered context client, as well as a message handler field 612 containing the reference to a message handler provided by the context client for processing messages from the characterization module. The characterization module preferably adds a row to the context client table for each context client that calls the RegisterContextClient function. For example, the characterization module preferably adds row 603 when the region_analysis context client calls the RegisterContextClient function. Added row 603 contains a reference to the message handler for the region_analysis context client.

EnumerateAttributes

Context clients call this function to request a listing of attributes that meet certain criteria, passing the following parameter:

Source—The name of the context server providing the attributes that the context client is requesting. If supplied, the characterization module returns all attributes from the corresponding context server. If not supplied, the characterization module returns all attributes.

This function returns the following information to the calling context client:

Attributes—A list of the attributes that meet the request's criteria. If no attributes meet the criteria, the list is empty. If an attribute meets the criteria but its source prohibits the context client from seeing the attribute, it is not included in the list.

If a source is specified and not found, the characterization module returns an error to the context client. In additional preferred embodiments, other parameters may be included to limit the set of attributes that are enumerated.

RegisterToConsumeAttributeOrInstance

A context server calls this function for each attribute or attribute instance that it will be requesting, passing the following parameters:

ContextClientName—The context client's name

AttributeName—The name of the attribute that the context client is requesting to consume.

Source—The context server whose instance of this attribute the context client is registering to consume. If blank, the request constitutes a request to consume a mediated attribute, rather than an attribute instance.

Context clients may register for attributes at any time. Requests for nonexistent attributes produce an error. Requests are not persistent, so the context client must register again to consume the attribute or attribute instance when it becomes available.

FIG. 7 is a data structure diagram showing an attribute or instance registration table that maintains a portion of the state of the characterization module. The attribute or instance registration table contains rows 701–704, each corresponding to a different registration that a context client has made for an attribute or an attribute instance. Each row contains a context client name field 711 indicating the name of the context client registering to consume the attribute or attribute instance, an attribute name field containing the attribute name for the attribute or attribute instance, and a context server name field 713 that, for attribute instance registrations contains the name of the context server providing the instance, which is blank for attribute registrations. For example, row 704 indicates that the location_map context client has registered to consume the instance of the user.in_region provided by the region_analysis context server.

GetAttribute

Context clients call this function to request an attribute value, passing the following parameters:

Name—A name identifying the attribute.

Source—The name of the context server from which to obtain the requested attribute. If no Source is specified, the characterization module assumes the attribute may come from any source, and it uses an attribute mediator to select one.

Attribute mediator—The name of the selection method that it would like used to select the attribute from multiple instances. If no attribute mediator is provided, the characterization module's default method is used. If a source and an attribute mediator are provided, the mediator is ignored. The characterization module preferably provides attribute mediators such as the following: a mediator that selects the first attribute instance that was created, a mediator that selects the last attribute instance that was created, a mediator that selects the first attribute instance to be provided in response to a request for evaluation, a mediator that selects the attribute instance having the lowest level of uncertainty, a mediator that selects the attribute instance having the newest data value, a mediator that calculates the average of the available attribute instances, a mediator that selects the most common of the attribute instances, a mediator that allows the user to select among the attribute instances, and mediators that select an attribute instance whose confidence level, as adjusted for attenuation over the age of the data at a variety of rates, is the highest. Those skilled in the art will appreciate that additional types of attribute mediators may also be employed by the characterization module and requested by context clients.

Age—An expression of the maximum age of the attribute information. If the request is made for a specific attribute instance by specifying a source, then only that instance is checked, and if too old, it is freshened. If no source is specified and multiple instances are present, the characterization module applies the attribute mediator to those that satisfy the age requirement. If no instances satisfy the age requirement, all instances are freshened prior to the application of the attribute mediator.

Timeout—A period of time within which the characterization module should return the attribute. If the attribute is not evaluated within this time, the characterization module sends an error message to the context client. The resulting return values are those of the most recent valid evaluation, or null if no valid data are available. A timeout value of zero instructs the characterization module to wait indefinitely for a response.

Supplemental Properties—The context server may also return to the characterization module names and values for supplemental properties associated with the attribute instance. For example, some supplemental properties may include security information used to determine which context clients may receive attribute instance, as well as additional information further characterizing the attribute instance.

If the request timeout is exceeded and the characterization module subsequently responds to the request, the returned value replaces the current most recent value cached in the characterization module. If an error is returned after the timeout period, it is ignored. The characterization module preferably does not send additional information to the context client that initiated the request.

This function returns the following to the calling context client:

Name—A string that identifies the attribute.

Value—The quantity of the attribute.

Uncertainty—A quantity that represents the range of likely values around Value that the attribute is likely to have. The contents of the Uncertainty property depend upon what type of information is stored in Value. The Uncertainty property characterizes the extent to which the attribute value may differ from the real quantity being measured, based upon factors including—but not limited to—the precision of measuring apparatus used to measure the quantity, the conversion of continuous quantities to discrete values in the measurement process, random fluctuations, temporal variations, systematic errors, and measurement latency.

Timestamp—A timestamp that represents the effective age of the data. In particular, the timestamp specifies the time at which the attribute value would have been valid had it been measured directly at that moment, irrespective of whether the attribute value was actually measured at that time.

Units—The units of measure in which the Value and Uncertainty have been expressed.

Source—A reference to the object that created and owns the instance of the attribute, usually a context server. If the attribute comes from a condition or a condition monitor, the source is the source of the condition or condition monitor. Some attributes that refer to the characterization module or that are monitored by the characterization module have the characterization module as the source.

Attribute mediator—The name of the selection method that was used to select the attribute from multiple instances. If no attribute mediator was used (either because only one instance of the attribute was available or because a source was specified), the attribute mediator is left blank.

Format Version—The version of the attribute's format specification.

Flags—Not in use at this time.

Supplemental Properties—Where the context server has provided supplemental properties, they are returned to the context client, except where the supplemental properties are designated to not be provided to context clients.

Reference to Context Server's Callback Function—Optional: The characterization module may return to the context client a direct reference to the context server that provided the returned attribute instance, enabling the context client to call the context server directly in the future to get a new value for the attribute.

This function returns an error to the calling context client if the requested attribute, requested source, or the requested mediator does not exist or if its value is unavailable. Attributes whose values are unavailable are ignored if other instances of the attribute satisfy the request made by the context client.

Figure 8:
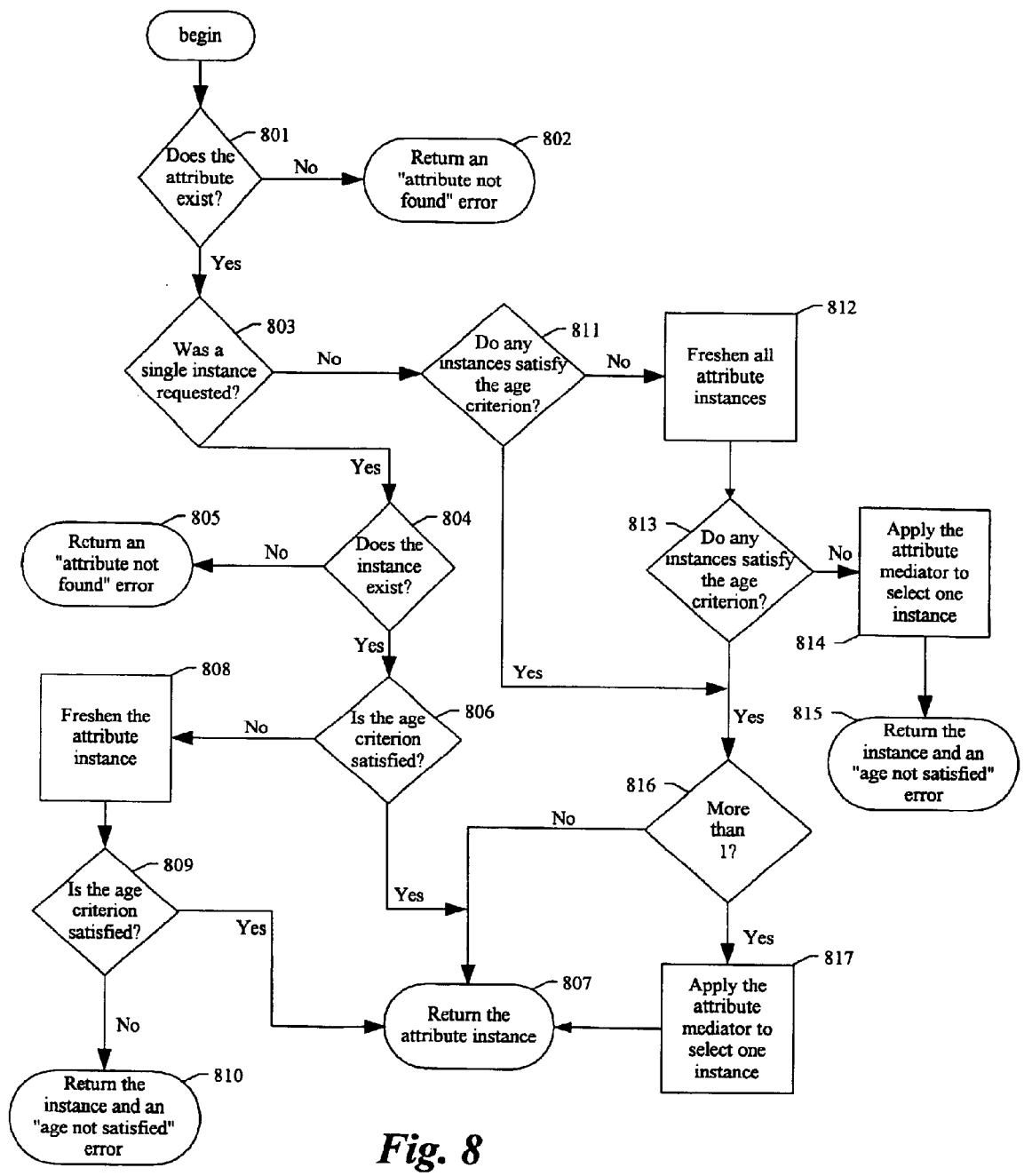
FIG. 8 flow diagram showing the steps preferably performed by the characterization module when the GetAttribute function is called.

FIG. 8 is a flow diagram showing the steps preferably performed by the characterization module when the GetAttribute function is called. In step 801, if the requested attribute exists, then the facility continues in step 803, else the facility continues in step 802 to return an "attribute not found" error. In step 803, if a single instance of the attribute was requested, then the facility continues in step 804, else the facility continues in step 811. In step 804, if the requested instance exists, then the facility continues in step 806, else the facility continues in step 805 to return an "attribute instance not found" error. In step 806, if the age criterion specified for the attribute request is satisfied, then the facility continues in step 807 to return the requested attribute instance, else the facility continues in step 808 to "freshen" the attribute instance by calling the appropriate context servers' request handler to request evaluation of the attribute instance. In step 809, if the age criterion is satisfied by the freshened attribute instance, then the facility continues in step 807 to return the freshened attribute instance, else the facility continues in step 810 to return the freshened attribute instance with an "age not satisfied" error.

In step 811, where a single attribute instance was not requested, if any registered instances of the attribute satisfy the age criterion, then the facility continues in step 816, else the facility continues in step 812. In step 812, the facility freshens all registered instances of the requested attribute. In step 813, if any of the attributes freshened in step 812 satisfy the age criterion, then the facility continues in step 816, else the facility continues in step 814. In step 814, the facility applies the requested attribute mediator to select one instance, or otherwise derive a value from the registered instances. In step 815, the facility returns the instance with an "age not satisfied" error.

In step 816, where one or more instances satisfy the age criterion, if more than one instance satisfies the age criterion, then the facility continues in step 817, else the facility continues in step 807 to return the attribute instance that satisfies the age criterion. In step 817, the facility applies the requested attribute mediator to select one instance from among the instances that satisfy the age criterion, or to otherwise derive a value from the instances that satisfy the age criterion. After step 817, the facility continues in step 807 to return the value produced by the mediator.

The characterization module requests attributes from a context server by calling the request handler registered by the context server, passing the following parameters:

Attribute Name—The name of the attribute being requested.

Timeout—The timeout period that the context server is expected to fulfill.

The context server is expected to satisfy the request within the timeout period with the following information:

Value—The quantity of the attribute.

Uncertainty—A quantity that represents the range of likely values around Value that the attribute is likely to have. The contents of the uncertainty property depend upon what type of information is stored in Value. The uncertainty is required and is expressed in the same units and format as the value.

Timestamp—A timestamp that represents the effective age of the data. This age reflects the point in time when the value is most accurate. It is the responsibility of the context server to determine how the timestamp relates to those of attributes that it uses. The timestamp is required, and is preferably determined with the computing platform's clock to facilitate easy comparison in context clients.

Units—The units of measure in which the Value and Uncertainty have been expressed as a predefined set of allowable units, from among a predetermined set of allowable units. The units parameter is required.

Format Version—The version of the format specification used to express the attribute's value and uncertainty.

If the context server is able to determine that the request cannot be answered, it returns an error to the characterization module. For instance, the context server may be asking a physical sensor for data, and the physical sensor is not responding.

If the context server cannot provide an attribute because it received an error message from an attribute that it queries, it returns the error message that it received.

When a call to this function necessitates the reevaluation of an attribute instance, the characterization module preferably substitutes that value in the corresponding row of the attribute instance table, thereby caching the attribute instance for possible future use. FIG. 9 is a data structure diagram showing updated contents of the attribute instance table. It can be seen in attribute instance table 900 that, upon reevaluation by the ips context server of its instance of the user.elevation attribute, the characterization module replaced the former contents of the value, uncertainty and timestamp field of row 903, shown in FIG. 7, with the values resulting from the reevaluation shown in FIG. 9.

GetAllAttributeInstances

Context clients call this function to request all instances of a particular attribute. This function uses the same parameters as GetAttribute, except that the attribute source is omitted. This function returns the same information for each attribute instance.

In one embodiment, this function is separate from the GetAttribute function. In an alternative embodiment, this function is omitted and the GetAttribute function is called without specifying the attribute source parameter in order to request all instances of a particular attribute.

CompleteContextServerEvaluation

To force a context server to calculate all of its output attributes at the same time, a context client calls this function, passing the following parameters:

Context Server Name—An identifier of the context server of interest.

Timeout—A period of time within which the characterization module should successfully force a complete evaluation. If the context server's attributes are not completely evaluated within this time, the characterization module sends an error message to the context client.

When this function is called, it in turn calls the request handler for the identified context server, requesting complete evaluation of the context server's attributes by specifying a special value for the AttributeName parameter. In response, the context server evaluates all of it attributes and provides them to the characterization module delaying other requests until it has finished. If the context server uses other attributes to evaluate its own, it requests fresh versions of these attributes, but it is neither required to or prohibited from requesting complete evaluation.

This function returns the following to the calling context client:

Attributes—The attributes that were simultaneously evaluated including all of their constituent information as specified in the GetAttribute section. Note that the attribute source need not be repeated for each attribute.

This function returns an error if the request either timed-out or there was no context server with the specified name.

The characterization module possesses several attributes of its own that may be of interest to context clients and context servers. Read-only parameters are surfaced as attributes identical to those created by other context servers, except that the owner of these attributes is the characterization module itself. Several adjustable items require two-way information flow and thus have their own interfaces. In an alternative embodiment, adjustable items are exposed as attributes.

GetCharacterizationModuleAttribute

Context clients call this function to request attributes containing information about the characterization module, passing a parameter identifying the requested attribute. The available items are attributes for which the characterization module is the creator and owner; otherwise they behave identically to all other attributes, characterization module attributes are visible to all context clients. The following read-only characterization module attributes may be requested:

Version—Contains a description of the characterization module version.

Path—A string containing the absolute path within which the characterization module has been installed, in the proper format for the computing platform.

Time—The local time as maintained by the computer's clock.

Date—The date as maintained by the computer's clock.

Default Timeout—Some requests require polling context servers for attribute information. The characterization module sends an error to the requesting context client if the context server does not respond within a specified time interval. If the context client has not specified this interval with its request the characterization module's default value is used. A timeout value of zero instructs the characterization module to wait indefinitely for a response. No parameters are necessary to read the default timeout setting, and such requests result in an immediate response from the characterization module with that information. The default timeout may preferably be changed by the user via a characterization module control application/control panel applet. In additional embodiments, the default attribute mediator may be changed in another manner, such as under the control of a program other than the characterization module.

Default Attribute Mediator—Context clients can read the characterization module's default attribute mediator. No parameters are necessary to read the default attribute mediator, and the characterization module returns the attribute mediator's name. The default attribute mediator may preferably be changed by the user via a characterization module control applications control panel applet. In additional embodiments, the default attribute mediator may be changed in another manner, such as under the control of a program other than the characterization module.

In one embodiment, this function is separate from the GetAttribute function. In an alternative embodiment, this function is omitted and the GetAttribute function is called in order to request a characterization module attribute.

CreateCondition

Context clients call this function to create a condition to check a relationship between an attribute and a value or between two attributes, passing the following:

Name—A name for the condition. This name must be unique among all conditions created by the same context client.

$1^{st}$ Logical Parameter—An attribute name identifying an attribute, an attribute name and source identifying an attribute instance, or a condition name identifying a condition.

$2^{nd}$ Logical Parameter—An attribute name identifying an attribute, an attribute name and source identifying an attribute instance, or a condition name identifying a condition.

Value—A value for attribute comparison. If an attribute is provided as the $2^{nd}$ logical parameter, the value is ignored.

Logical Operator—One of a predefined set of logical operators. The allowed operators depend upon whether the characterization module is asked to compare attributes or conditions as shown in Table 1 below.

TABLE 1

List of Logical Operators for Conditions

| Attributes | Conditions |
|---|---|
| > | AND |
| < | OR |
| = | XOR |
| >= | NOR |
| <= | NOT |
| <> | |

Conditions may compare an attribute with another attribute, and attribute with a value, or a condition with another condition. These combinations are listed below in Table 2.

TABLE 2

Parameter Usage for Conditions

| $1^{st}$ Parameter | $2^{nd}$ Parameter | Action |
|---|---|---|
| Attribute Name | <none> | Compares attribute to value |
| Attribute Name | Attribute Name | Compares attributes to each other |
| Condition Name | Condition Name | Compares conditions to each other |

This function returns an error if the requested name is already in use by another condition that was created by the calling context client. An error is returned if the referred to attributes or conditions do not exist. An error is returned if an attribute is requested along with a condition or vice-versa.

FIG. 10 is a data structure diagram showing a condition table that contains a portion of the state of the characterization module. Condition table 1000 has a row for each condition created by a context client. Row 1001 contains a condition name field 1011 containing the name of the condition, a context client name 1012, identifying the context client that created the condition, a first logical parameter field 1013 and a second logical parameter field 1014 identifying attributes or other conditions that are compared by the condition, a comparison value 1015 that specifies a value to which the first logical parameter is compared if no second logical parameter is listed, and a logical operator 1016, identifying the logical operator to be applied in the comparison. The characterization module preferably adds row 1001 to condition table 1000 when the region_analysis context client creates the in_region_true condition to indicate whether the user is presently within a special region. Added row 1001 indicates that the in_region_true condition was created by the region_analysis context client, and has first logical parameter user.in_region, no second logical parameter, comparison value TRUE, and logical operator "=".

EvaluateCondition

A context client calls this function to query conditions that it has created passing the following parameters:

Name—The name of the condition.

Timeout—A period of time within which the characterization module should have successfully evaluated the condition.

This function returns the following to the calling context client:

Value—A Boolean expression resulting from the evaluation of the condition.

This function returns an error if the condition requests a non-existent attribute, the requested condition does not exist, or the timeout is exceeded.

When this function is called for a particular condition, the facility preferably uses the information in the corresponding row of the condition table to evaluate the condition. For example, when this function is called for the in_region_true condition, the facility preferably uses information row 1001 of condition table 1000 shown in FIG. 10 to evaluate this condition.

CreateConditionMonitor

A context client calls this function to create a condition monitor to monitor for a change in a condition and be notified when it occurs, passing the following parameters:

Name—The name of the condition monitor.

Condition—The name of the condition that triggers the condition monitor.

Behavior—Specifies when the condition monitor triggers. The condition monitor may be triggered when the condition becomes true, becomes false, or when it changes state in either direction.

Frequency—The time between subsequent checks for triggering of the condition monitor. This value must be non-zero.

Trigger Handler—A reference to a context client procedure that the characterization module notifies when the condition monitor is triggered.

An error is returned if the name is already in use by another condition monitor from the calling context client.

Figure 11:
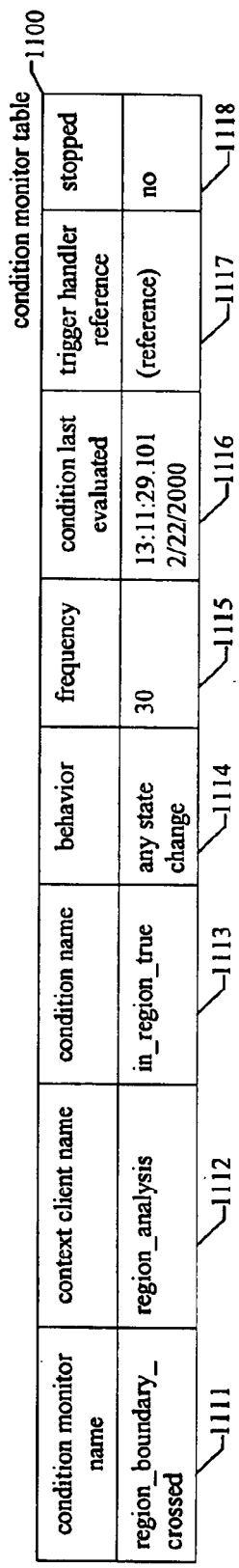
FIG. 11 is a data structure diagram showing a condition monitor table that maintains a portion of the state of the characterization module.

FIG. 11 is a data structure diagram showing a condition monitor table that maintains a portion of the state of the characterization module. Condition monitor table 1100 has a row 1101 corresponding to a condition and containing each of the following fields: a condition monitor name field 1111 containing the name of the condition monitor; a context client name field 1112 containing the name of the context client that created the condition monitor; a condition name field 1113 that contains the name of the condition monitored by the condition monitor; a behavior field 1114 that indicates whether the condition monitor is triggered when the condition becomes true, when it becomes false, or when it changes value in either direction; a frequency field 1115 showing the frequency with which the condition monitor evaluates the condition; a condition last evaluated field 1116 showing the time at which the condition monitor last evaluated the condition; a trigger handler reference 1117 that identifies a trigger handler function of the context client that is to be called when the condition monitor is triggered; and a stopped field 1118 that indicates whether the context client has suspended operation of the condition monitor. The condition monitor preferably adds row 1101 to the condition monitor table when the region_analysis context client creates the region_boundary_crossed condition to notify the region_analysis context client when the value of the in_region_true condition changes, indicating that the user has entered or left the special region. Row 1101 indicates that the region_boundary_crossed condition monitor was created by the region_analysis context client, is based upon the in_region_true condition, monitors for both TRUE and FALSE behavior, is evaluated every 30 seconds, was last evaluated at 13:11:29.101 on Feb. 22, 2000, has the trigger handler referenced in field 1117 of row 1101, and is not presently stopped.

StopConditionMonitor

A context client calls this function to temporarily suspend the operation of a condition monitor, passing the following parameter:

Name—The name of the condition monitor.

This function returns an error to the calling context client if the name does not correspond to an existing condition monitor created by that context client.

Figure 12:
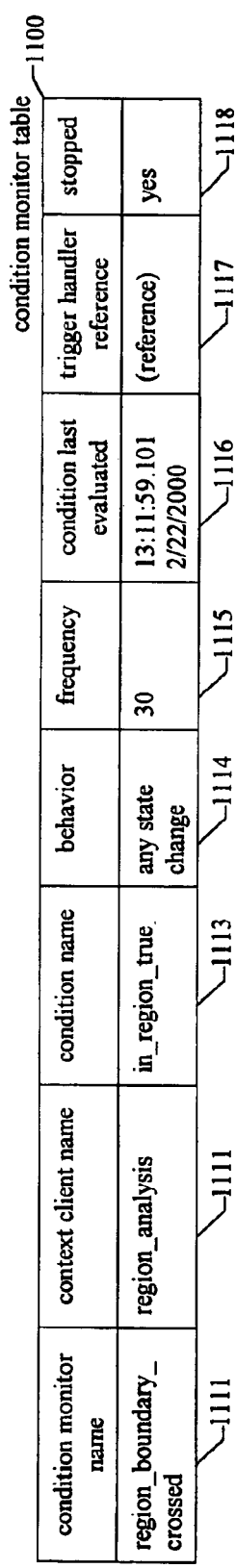
FIG. 12 is a data structure diagram showing updated contents of the condition monitor table.

FIG. 12 is a data structure diagram showing updated contents of the condition monitor table. It can be seen from stopped field 1218 of row 1201 in condition monitor table 1200 that the region_analysis context client has stopped, or suspended the operation of, the region_boundary_crossed condition monitor, perhaps in response to the observation that the user is now asleep and his or her location will remain constant.

StartConditionMonitor

A context client calls this function to resume operation of a stopped condition monitor, passing the following parameter:

Name—The name of the condition monitor.

This function returns an error to the calling context client if the name does not correspond to an existing condition monitor created by that context client.

When the StartConditionMonitor function is called, the facility preferably changes the contents of the stopped field 1118 from "yes" as shown in FIG. 11 to "no" as shown in FIG. 12, so that the characterization module resumes operation of the condition monitor.

RemoveConditionMonitor

Context clients call this function to remove a condition monitor that it has created, passing the following parameter:

Name—The name of the condition monitor.

This function returns an error to the calling context client if the name does not correspond to an existing condition monitor created by the calling context client. If the condition monitor is active when this function is called, this function automatically stops the condition monitor prior to removing it.

When this function is called, the characterization module preferably deletes the row of the condition monitor table corresponding to the condition monitor. For example, if this function is called for the region_boundary_crossed condition monitor, the characterization module preferably deletes row 1201 of condition monitor table 1200 shown in FIG. 12.

RemoveCondition

A context client calls this function to remove a condition that it owns, passing the following parameter:

Name—the name of the condition to be removed.

An error is returned if the name does not correspond to an existing condition created by the calling context client. The characterization module returns an error if other conditions or condition monitors rely upon the condition, and the condition is not removed.

When this function is called for a particular condition, the characterization module preferably deletes the corresponding row from the condition table. For example, when this function is called for in_region_true condition the facility preferably deletes row 1001 from condition table 1000 shown in FIG. 10.

In the foregoing, a preferred embodiment is described in which conditions and condition monitors are created separately. In an alternative preferred embodiment, conditions and condition monitors are created together as a single entity, with a single API function call.

UnregisterToConsumeAttributeOrInstance

A context server calls this function to unregister to consume an attribute or attribute instance that it is registered to consume, passing the following parameters:

Context Server Name—The name of the context server.

Attribute Name—The name of the attribute for which the context client is unregistering.

Source—For requests to unregister to consume an attribute instance, contains the name of the context server providing the attribute instance. For requests to unregister to consume an attribute, is blank.

This function removes the row corresponding to the specified attribute or instance registration from the attribute or instance registration table.

This function returns an error if the attribute or instance registration table does not contain a row corresponding to the specified registration.

UnregisterContextClient

Context clients may unregister themselves at any time. Before calling this function, context clients are expected to first remove all conditions, condition monitors, and attributes that pertain to the registration they are ending, parsing the following:

Context Client Name—Name of the context client to unregister.

Unregistration of a context client results in the removal of all remaining conditions, condition monitors, and attribute consumption registrations that it owns.

The characterization module may ask the context client to unregister. Such requests require no parameters. The context client responds to such a request by calling this function within a reasonable period of time. If such acknowledgement is not made, the characterization module preferably removes the context client registration and all of its conditions and condition monitors automatically.

When this function is called for a particular context client, the characterization module preferably deletes the corresponding row from the context client table. For example, when this function is called for the region_analysis context client, the facility preferably deletes row 603 from context client table 600 shown in FIG. 6.

CheckAttributeInstanceDependencies

To determine whether there are context clients using one of its attribute instances, a context server calls this function, passing the following parameter:

Attribute—The name of the attribute.

Context Server Name—The name of the calling context server.

This function returns the following to the calling context server:

Number—The number of context clients that are registered for the attribute instance named in the request. This includes all context clients that have registered for the context server's specific instance as well as those that have registered for the attribute for which there is only one instance. This does not include registrations for an attribute for which there are additional context server's able to satisfy the context clients' requests.

This function returns an error if the requested attribute instance does not exist.

When this function is called, it preferably first refers to the attribute or instance registration table to count how many context clients have registered specifically for the calling context server's instance of the attribute. The function further identifies any registrations for this attribute from any context server, i.e., rows of the attribute or instance registration table containing the attribute name of this attribute instance and no context server name. For these identified rows, the function consults the attribute instance table to determine whether instances of this attribute other than the one provided by the calling context server are present in the table. If not, the function also counts the number of context clients registered to consume the attribute from any context server.

RemoveAttributeInstance

Context servers call this function to remove the instances of attributes that they have created, passing the following parameter:

Name—The name of the attribute to remove.

This function returns an error if the requested name does not correspond to an attribute that the context server may remove.

This function notifies context clients registered for this attribute instance that it is no longer available. Context clients that register for any one of multiple instances of an attribute are only notified when the last instance of the attribute is removed. If conditions or condition monitors rely upon the attributes that are being removed, their owners are notified, and the conditions and rules are removed.

When this function is called for a particular attribute instance, the characterization module preferably removes the corresponding row from the attribute instance table. For example, when the location_region_analysis context server calls this function for its instance of the user.in_region attribute, the characterization module preferably deletes row 504 from attribute instance table 500 shown in FIG. 5.

UnregisterContextServer

A context server may unregister at any time by calling this function. Calling this function requires no additional parameters.

Unregistration causes the characterization module to remove any remaining attribute instances belonging to that context server (thereby requiring the characterization module to notify any registered context clients) prior to actually releasing the context server.

The characterization module may ask the context server to unregister, in which case the context server is expected to acknowledge the request by requesting unregistration. Failure of the context server to acknowledge the request within a reasonable period of time causes the context server and its attributes to be removed automatically.

The user is preferably able to control several values that affect characterization module function using a windows control panel applet dedicated to the characterization module. The parameters under user control include the following:

Default Timeout—See Default Timeout section.

Default Attribute Mediator—See Default Attribute Mediator section.

Context Server Listing—A list of all currently registered context servers and whether or not each is automatically started at characterization module startup.

Context Client Listing—A list of all currently registered context clients and the attributes for which they have registered.

Users can enter a default timeout value. This value must be greater than or equal to zero.

Users can select the default attribute mediator from a list of available mediators.

Users can refresh the display of context servers and context clients at any time.

When UnregisterContextServer function is called by a particular context server, the characterization module preferably removes the corresponding row from the context server table. For example, when this function is called for the location_region_analysis context server, the characterization module preferably removes row 403 from context server table 400 shown in FIG. 4.

In the foregoing, the facility is described as being implemented using a characterization module that is called by context servers and context clients, caches attribute values, and maintains status information about the operation of context servers and context clients. In an alternative preferred embodiment, however, the facility operates without the use of such as characterization module. In this embodiment, context servers communicate directly with context clients.

Figure 13:
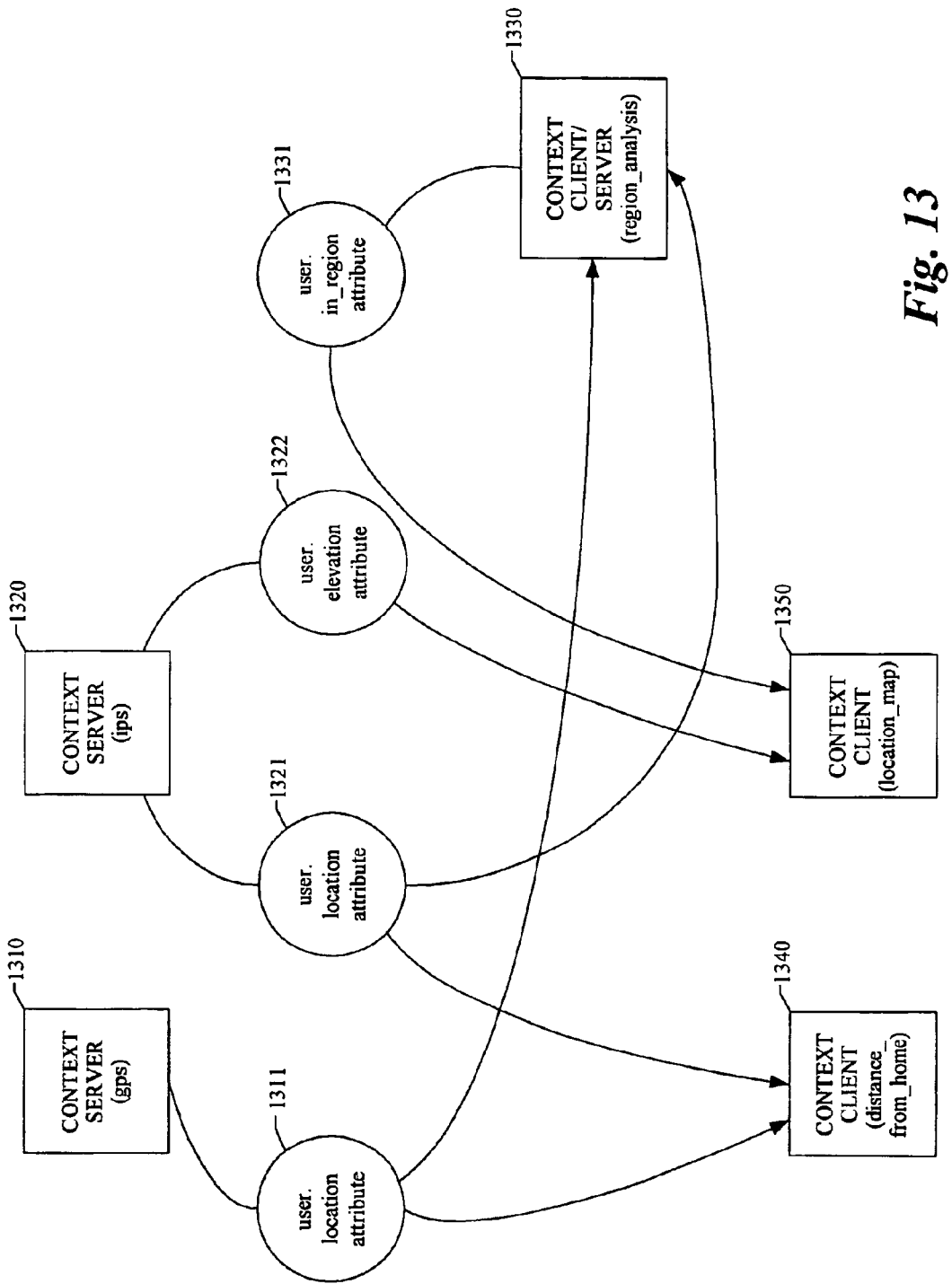
FIG. 13 is a data flow diagram showing the operation of the facility without a characterization module.

FIG. 13 is a data flow diagram showing the operation of the facility without a characterization module. It can be seen in FIG. 13 that context servers 1310, 1320, and 1330 provide attributes directly to context clients 1330, 1340, and 1350. For example, it can be seen that context server 1320 provides a user.elevation attribute 1322 directly to context client 1350. In this embodiment, the context client may itself cache attribute values recently obtained from a context server. Further, in this embodiment, context clients may themselves interrogate context servers for an enumeration of their attributes, and mediate between attribute instances provided by different context servers. For example, context client 1340 may mediate between the instance 1311 of the user.location attribute provided by context server 1310 and the instance 1321 of the user.location attribute provided by context server 1320.

Additional embodiments of the facility support supplemental properties for attribute instances that are supplied by the context server supplying an attribute instance, maintained by the characterization module, and, in some cases returned to context clients requesting a value of the corresponding attribute.

FIG. 14 is a data structure diagram showing an attribute instance property table that maintains a portion of the state of the characterization module. Each row in the attribute instance property table 1400 corresponds to a supplemental property provided by a context server for an attribute instance it provides. Each row contains an attribute name field containing the attribute name for the attribute instance, a context server name 1402 containing the name of the context server providing the attribute instance, a property name 1403 containing a property name for the property, and a property value field 1404 containing the value of the property. For example, row 1401 shows that with its instance of the user.location attribute, the ips context server has also provided a security_token property having the value 5A637AR. Some supplemental properties are preferably provided to context clients calling the GetAttribute function for the attribute instance. Other supplemental properties, such as the security_token property, represented by row 1401, are preferably withheld from context clients for the exclusive use of the characterization module. For example, the characterization module preferably uses the security_token property to determine whether a particular context client should be permitted to obtain values of the user_location attribute instance provided by the ips context server by calling the GetAttribute function.

In additional preferred embodiments, the facility may operate with a partial characterization module. Such a partial characterization module may include various combinations of the functionalities of routing communication between context servers and the context clients that consume their attributes, caching attribute values, enumerating available attributes, and providing attribute mediation. In further preferred embodiments, the facility utilizes a characterization module that constitutes a passive data store that is shared between context servers and context clients. Context servers access the data store to write attribute values, and context clients access the data store to read attribute values.

In additional preferred embodiments, the facility may provide a characterization module that implements a "push" information flow model, in which, each time an attribute value provided by a context server changes, the new value is automatically provided to context clients. In some cases, context servers may push selected attribute values. For example, context servers may push attributes whose values are constant, attributes whose values change infrequently, or attributes whose values are expensive to obtain. In further preferred embodiments, the facility provides a characterization module that implements a "pull" information flow model, in which attribute values are only obtained by the characterization module from the context servers when they are requested by a context client. In additional preferred embodiments, characterization modules are provided that support a variety of other information flow models.

It will be understood by those skilled in the art that the above-described facility could be adapted or extended in various ways. For example, the characterization module may be implemented in computing devices other than wearable computers, including other types of mobile computing devices, such as personal digital assistants. The characterization module may further be implemented on various types of stationary and/or distributed computing devices, as well as non-traditional computing devices, such as smart appliances. Further, rather than the attribute, context server, context client, condition, and condition monitor names discussed above, the facility may use other types of identifiers, such as handles. While the foregoing description makes reference to preferred embodiments, the scope of the invention is defined solely by the claims that follow and the elements recited therein.

We claim:

1. A method in a computing device for exchanging context attributes, comprising:

receiving an invocation request to provide an attribute value, the invocation request being generated by a requesting attribute consumer and, identifying the attribute whose value is to be provided, the invocation request further specifying a basis for determining one of a plurality of values of the identified attribute that are available from different sources to provide such that a newest available value of the identified attribute is to be selected; and in response to receiving the invocation request, providing a value for the identified attribute to the requesting attribute consumer that is determined from the plurality of available values of the identified attribute using the specified basis such that the provided value is the newest available value of the identified attribute.

2. The method of claim 1 wherein the invocation request is a function call.

3. The method of claim 1 wherein the invocation request is a procedure.

4. The method of claim 1 wherein the invocation request is an invocation message.

5. The method of claim 1 wherein a value of the identified attribute is stored, and wherein the stored value is provided to the requesting attribute consumer.

6. The method of claim 1 wherein the identified attribute is associated with an attribute source, and wherein the method further comprises obtaining a value of the identified attribute from the attribute source with which the identified attribute is associated, and wherein the value of the attribute obtained from the attribute source is provided to the requesting attribute consumer.

7. The method of claim 6, furthering comprising obtaining a value of a property associated with the identified attribute from the attribute source with which the identified attribute is associated.

8. The method of claim 7, furthering comprising providing the obtained associated property value to the requesting attribute consumer.

9. The method of claim 7, wherein the obtained property is security information associated with the identified attribute, further comprising using the security information to determine whether to provide a value for the identified attribute to the requesting attribute consumer.

10. The method of claim 1 further comprising, in addition to providing a value for the identified attribute to the requesting attribute consumer, providing units of the value for the identified attribute.

11. The method of claim 1 further comprising, in addition to providing a value for the identified attribute to the requesting attribute consumer, providing a timestamp for the identified attribute.

12. The method of claim 1 wherein the identified attribute is information reflecting an aspect of the computing device.

13. The method of claim 7 wherein the computing device has a visual output device, and wherein the identified attribute is information about the availability of the visual output device.

14. The method of claim 1 wherein the computing device is present in an environment, and wherein the identified attribute is information reflecting an aspect of the environment.

15. The method of claim 1 wherein the identified attribute reflects a temperature of an environment in which the computing device is present.

16. The method of claim 1 wherein the computing device has a user, and wherein the identified attribute is information reflecting an aspect of the user.

17. The method of claim 1 wherein the identified attribute a blood pressure of a user of the computing device.

18. The method of claim 1 wherein one or more applications are executing on the computing device and wherein the identified attribute is information reflecting an aspect of an executing application.

19. The method of claim 18 wherein an electronic messaging application is among the applications executing on the computing device, and wherein the identified attribute indicates whether new messages have been received by the electronic messaging application.

20. The method of claim 1 wherein the computing device is outside a selected remote environment, and wherein the identified attribute is information reflecting an aspect of the remote environment.

21. The method of claim 1 wherein the identified attribute a temperature of a selected environment remote from the computing device.

22. The method of claim 1 wherein the computing device has a user, and wherein the identified attribute is information reflecting an aspect of a selected person other than the user.

23. The method of claim 22 wherein the selected person has a location, and wherein the identified attribute is the location of the selected person.

24. The method of claim 1 wherein the identified attribute is information reflecting an aspect of an identified person.

25. The method of claim 1 wherein the identified attribute being information reflects a temperature of an identified person.

26. The method of claim 1 wherein the invocation request further specifies a maximum age of the value of the identified attribute to be provided, and wherein the value provided to the requesting attribute consumer has an age that is no older than the specified maximum age.

27. The method of claim 1 wherein a value of the identified attribute is available from each of a plurality of sources, and wherein the invocation request further specifies one of the plurality of sources from which a value of the identified attribute is available, and wherein the value of the identified attribute provided to the requesting attribute consumer is from the specified source.

28. The method of claim 1 wherein a value of the identified attribute is available from each of a plurality of sources, and wherein the invocation request further specifies to provide a value of the identified attribute from each of the sources from which a value of the identified attribute is available, and wherein a value of the identified attribute from each of the sources from which a value of the identified attribute is available is provided to the requesting attribute consumer.

29. The method of claim 1 wherein a value of the identified attribute is available from each of a plurality of sources, and wherein the value of the identified attribute provided to the requesting attribute consumer is determined based upon the values of the identified attribute available from the plurality of sources.

30. The method of claim 29, further comprising caching the value of the identified attribute provided to the requesting attribute consumer.

31. The method of claim 1 wherein a plurality of values of the identified attribute are available from different sources, and wherein the invocation request further specifies to select one of the plurality of available values of the identified attribute to provide, and wherein the value of the identified attribute provided to the requesting attribute consumer is selected from the plurality of available values of the identified attribute.

32. The method of claim 1 wherein a plurality of values of the identified attribute are available from different sources, and wherein the invocation request further specifies to determine a value of the identified attribute to provide that is based upon the plurality of available values of the identified attribute but different than each of the plurality of available values of the identified attribute, and wherein the value of the identified attribute provided to the requesting attribute consumer is based upon the plurality of available values of the identified attribute but different from each of the plurality of available values of the identified attribute.

33. The method of claim 1 wherein a plurality of values of the identified attribute are available from different sources, and wherein the invocation request further specifies to determine, from the plurality of available values of the identified attribute, one value of the identified attribute to provide, and wherein the value of the identified attribute provided to the requesting attribute consumer is determined from the plurality of available values of the identified attribute.

34. The method of claim 33 wherein the invocation request further specifies a basis for determining; from the plurality of available values of the identified attribute, one value of the identified attribute to provide, and wherein the value of the identified attribute provided to the requesting attribute consumer is determined from the plurality of available values of the identified attribute using the specified basis.

35. The method of claim 34 wherein the available values of the identified attribute are each requested and received from a different source, and wherein the invocation request further specifies selecting the first-received available value of the identified attribute, and wherein the value of the identified attribute provided to the requesting attribute consumer is the first-received available value of the identified attribute.

36. The method of claim 34 wherein the invocation request further specifies soliciting selection by a user of one of the available values of the identified attribute, and wherein the value of the identified attribute provided to the requesting attribute consumer is an available value of the identified attribute selected by the user.

37. The method of claim 1 further comprising, in addition to providing a value for the identified attribute to the requesting attribute consumer, providing an uncertainty level for the identified attribute.

38. The method of claim 1 wherein the invocation request is received by a context characterization module, and wherein the context characterization module has an attribute under its control, and wherein the invocation request identifies the attribute under the control of the characterization module, and wherein the attribute whose value is provided to the requesting attribute consumer is the attribute under the control of the characterization module.

39. The method of claim 1 further comprising, before the invocation request to provide an attribute value is received, receiving from the attribute consumer an invocation request to register the attribute consumer.

40. The method of claim 39 wherein the invocation request to register an attribute consumer indicates that the requesting attribute consumer reserves an opportunity to later request provision of a value of the identified attribute, the method further comprising associating with the identified attribute an indication that the requesting attribute consumer is dependent on the identified attribute.

41. The method of claim 1 further comprising, before the invocation request to provide an attribute value is received, receiving an invocation request to register an attribute source for the identified attribute, and wherein the method further comprises obtaining a value of the identified attribute from the attribute source with which the identified attribute is associated, and wherein the value of the attribute obtained from the attribute source with which the identified attribute is provided to the requesting attribute consumer.

42. The method of claim 1, further comprising the step of, in response to receiving the invocation request, providing a name and a value of a property associated with the identified attribute to the requesting attribute consumer.

43. A method in a computing device for exchanging context attributes, comprising:
receiving an invocation request to provide an attribute value, the invocation request being generated by a requesting attribute consumer and, identifying an attribute whose vale is to be provide, the identified attribute having a source such that a value of the identified attribute previously-obtained value; and
in response to receiving the invocation request, providing to the requesting attribute consumer a value for the identified attribute by,
determining whether the age of the previously-obtained value of the identified attribute exceeds a specified maximum age;
if the age of the previously-obtained value of the identified attribute does not exceed the specified maximum age, providing the previously-obtained value of the identified attribute to the requesting attribute consumer; and
if the age of the previously-obtained value of the identified attribute does exceed the specified maximum age;
obtaining a new value of the identified attribute from the source of the identified attribute, and
providing the new value of the identified attribute to the requesting attribute consumer.

44. The method of claim 43 further comprising caching the new value of the identified attribute.

45. The method of claim 43 wherein the invocation request is a function call.

46. The method of claim 43 wherein the invocation request is a procedure.

47. The method of claim 43 wherein the invocation request is an invocation message.

48. The method of claim 43 wherein a value of the identified attribute is stored, and wherein the provided value is the stored value.

49. The method of claim 43 wherein the identified attribute is associated with an attribute source, and wherein the method further comprises obtaining a value of the identified attribute from that attribute source, and wherein the provided value is the obtained value from the attribute source.

50. The method of claim 43 further comprising, in addition to providing a value for the identified attribute to the requesting attribute consumer, providing units of the value for the identified attribute.

51. The method of claim 43 further comprising, in addition to providing a value for the identified attribute to the requesting attribute consumer, providing a timestamp for the identified attribute.

52. The method of claim 43 wherein the identified attribute reflects an aspect of the computing device.

53. The method of claim 52 wherein the computing device has a visual output device, and wherein the identified attribute reflects availability of the visual output device.

54. The method of claim 43 wherein the computing device is present in an environment, and wherein the identified attribute reflects an aspect of the environment.

55. The method of claim 43 wherein the computing device has a user, and wherein the identified attribute reflects an aspect of the user.

56. The method of claim 43 wherein one or more applications are executing on the computing device, and wherein the identified attribute reflects an aspect of an executing application.

57. The method of claim 56 wherein an electronic messaging application is among the applications executing on the computing device, and wherein the identified attribute indicates whether new messages have been received by the electronic messaging application.

58. The method of claim 43 wherein the computing device is outside a specified remote environment, and wherein the identified attribute reflects an aspect of the remote environment.

59. The method of claim 43 wherein the computing device has a user, and wherein the identified attribute reflects an aspect of a specified person other than the user.

60. The method of claim 59 wherein the specified person has a location, and wherein the identified attribute is the location of the specified person.

61. The method of claim 43 wherein the identified attribute reflects an aspect of an identified person.

62. The method of claim 43 wherein values for the identified attribute are available from each of a plurality of sources, wherein the invocation request further specifies one of those sources, and wherein the provided value is from the specified source.

63. The method of claim 43 wherein values for the identified attribute are available from each of a plurality of sources, wherein the invocation request further specifies to provide a value of the identified attribute from each of the sources from which a value of the identified attribute is available, and wherein the providing of the value to the requesting attribute consumer further includes providing to the requesting attribute consumer a value of the identified attribute from each of the sources from which a value of the identified attribute is available.

64. The method of claim 43 wherein values for the identified attribute are available from each of a plurality of sources, and wherein the value of the identified attribute that is provided to the requesting attribute consumer is determined based upon the values of the identified attribute available from the plurality of sources.

65. The method of claim 64, further comprising caching the value of the identified attribute provided to the requesting attribute consumer.

66. The method of claim 43 wherein a plurality of values of the identified attribute are available from different sources, and wherein the invocation request further specifies to select one of the plurality of available values of the identified attribute to provide, and wherein the value of the identified attribute provided to the requesting attribute consumer is selected from the plurality of available values of the identified attribute.

67. The method of claim 43 wherein a plurality of values of the identified attribute are available from different sources, and wherein the invocation request further specifies to determine a value of the identified attribute to provide that is based upon the plurality of available values of the identified attribute but different than each of the plurality of available values of the identified attribute, and wherein the value of the identified attribute provided to the requesting attribute consumer is based upon the plurality of available values of the identified attribute but different from each of the plurality of available values of the identified attribute.

68. The method of claim 43 wherein a plurality of values of the identified attribute are available from different sources, and wherein the invocation request further specifies to determine one value from the plurality of available values of the identified attribute to provide, and wherein the value of the identified attribute provided to the requesting attribute consumer is determined from the plurality of available values of the identified attribute.

69. The method of claim 68 wherein the invocation request further specifies a basis for determining one value from the plurality of available values of the identified attribute to provide, and wherein the value of the identified attribute provided to the requesting attribute consumer is determined from the plurality of available values of the identified attribute using the specified basis.

70. The method of claim 69 wherein the available values of the identified attribute are each requested and received from a different source, and wherein the invocation request further specifies selecting the first-received available value of the identified attribute, and wherein the value of the identified attribute provided to the requesting attribute consumer is the first-received available value of the identified attribute.

71. The method of claim 69 wherein the invocation request further specifies soliciting selection by a user of one of the available values of the identified attribute, and wherein the value of the identified attribute provided to the requesting attribute consumer is an available value of the identified attribute selected by the user.

72. The method of claim 43 wherein the invocation request is received by a context characterization module that has an attribute under its control, wherein the invocation request identifies the attribute under the control of the characterization module, and wherein the attribute whose value is provided to the requesting attribute consumer is the attribute under the control of the characterization module.

73. The method of claim 43 further comprising, before the invocation request to provide an attribute value is received, receiving from the attribute consumer an invocation request to register the attribute consumer.

74. The method of claim 73 wherein the invocation request to register an attribute consumer indicates that the requesting attribute consumer reserves an opportunity to later request provision of a value of the identified attribute, the method further comprising associating with the identified attribute an indication that the requesting attribute consumer is dependent on the identified attribute.

75. The method of claim 43 further comprising, before the invocation request to provide an attribute value is received, receiving an invocation request to register an attribute source for the identified attribute, and wherein the method further comprises obtaining a value of the identified attribute from the attribute source with which the identified attribute is associated, and wherein the value of the attribute obtained from the attribute source with which the identified attribute is provided to the requesting attribute consumer.

76. The method of claim 43 wherein the specified maximum age is older than the ages of any values for the identified attribute.

77. The method of claim 43 wherein the specified maximum age is an indication that any age is acceptable.

78. The method of claim 43 wherein the specification of the maximum age in the invocation request is a lack of an indication of an explicit maximum age, and wherein determining whether a value for the identified attribute has an age that is no older than the specified maximum age includes determining that any attribute value age is no older than the specified maximum age.

79. The method of claim 43 wherein the specification of the maximum age in the invocation request is a lack of an indication of an explicit maximum age, and wherein determining whether a value for the identified attribute has an age that is no older than the specified maximum age includes determining that any attribute value age is older than the specified maximum age.

80. The method of claim 43 wherein the specification of the maximum age in the invocation request is a lack of an indication of an explicit maximum age, and wherein determining whether a value for the identified attribute has an age that is no older than the specified maximum age is performed in a manner unknown to the requesting attribute consumer.

81. The method of claim 43 wherein the specification of the maximum age in the invocation request is optional, and wherein determining whether a value for the identified attribute has an age that is no older than the specified maximum age when an explicit maximum age is not specified in the invocation request includes determining whether the attribute value age is no older than a default maximum age.

82. The method of claim 81 wherein the default maximum age is specified by the requesting attribute consumer.

83. The method of claim 81 wherein the default maximum age is a system default.

84. The method of claim 81 wherein the default maximum age is a default provided by a source for the provided attribute value.

85. The method of claim 81 wherein the default maximum age is obtained externally.

86. The method of claim 81 wherein the default maximum age is functionally determined based at least in part on a current context of the computing device.

87. The method of claim 81 wherein the method is performed by a characterization module executing on the computing device, and wherein the default maximum age is functionally determined based at least in part on a current context of the characterization module.

88. The method of claim 81 wherein the default maximum age is functionally determined based at least in part on a current context of the requesting attribute consumer.

89. The method of claim 81 wherein the default maximum age is functionally determined based at least in part on values of one or more derived attributes related to the identified attribute.

90. The method of claim 81 wherein each attribute has a distinct default maximum age.

91. The method of claim 90 wherein the default maximum ages for the attributes are stored in a table that is regularly updated.

92. The method of claim 90 wherein the default maximum ages for the attributes are stored in a table that is dynamically updated.

93. The method of claim 81 wherein the default maximum age is learned.

94. The method of claim 93 wherein the learning is performed based on specifications for maximum age from previous requests.

95. The method of claim 93 wherein the learning is performed based on monitoring values for the identified attribute over time.

96. The method of claim 93 wherein the learning is performed based on monitoring whether an earlier value for the default maximum age was later found to be appropriate.

97. The method of claim 43 wherein the specification of the maximum age includes one or more criteria for determining the maximum age in a manner based upon the provided attribute value.

98. The method of claim 43 wherein the maximum age is determined from a timestamp.

99. The method of claim 43 wherein the maximum age is determined relative to a time when the request was made.

100. The method of claim 43 wherein the maximum age is determined relative to a time when the request was received.

101. The method of claim 43 wherein the maximum age is determined relative to a time when a value for the identified attribute was last supplied.

102. The method of claim 43 wherein the maximum age is determined relative to a time when a value for the identified attribute was last generated.

103. The method of claim 43 wherein the maximum age is based on an absolute time.

104. The method of claim 43 wherein the maximum age is determined relative to a time when the provided attribute value was valid.

105. The method of claim 43 including, before the providing of the value to the attribute consumer, receiving from a source the provided value for the identified attribute and information regarding when the provided attribute value is valid.

106. The method of claim 43 wherein the providing of the identified attribute value includes providing information regarding when the provided attribute value is valid.

107. The method of claim 43 wherein the maximum age is based on when a source for values of the identified attribute was last checked.

108. The method of claim 43 wherein the maximum age is based on when a source for values of the identified attribute was valid.

109. The method of claim 43 wherein the maximum age is based on when values of the identified attribute were last obtained from a source.

110. The method of claim 43 wherein the maximum age is based on an expiration time for the provided attribute value.

111. The method of claim 43 wherein the maximum age is based on a specific time supplied by the requesting attribute consumer.

112. The method of claim 43 wherein the maximum age is represented as a range of ages that are acceptable for an attribute value to be provided.

113. The method of claim 43 wherein the maximum age is represented as a range of ages that are not acceptable for an attribute value to be provided.

114. The method of claim 43 wherein the maximum age is represented as multiple ages.

115. The method of claim 43 including providing a mechanism to functionally determine the maximum age.

116. The method of claim 43 wherein the provided attribute value is derived from information provided by multiple sources, and including determining the age for the provided attribute value.

117. The method of claim 43 wherein the specified maximum age includes indications of multiple criteria.

118. The method of claim 43 wherein the specified maximum age includes criteria for determining the maximum age that vary based on a source of the provided value for the identified attribute.

119. The method of claim 43 including, before the providing of the identified attribute value, determining the value of the identified attribute to be provided, the determining performed in such a manner as to only use attribute values whose age is less than the specified maximum age.

120. The method of claim 43 including, in response to the specified maximum age, generating a new value for the identified attribute to be used as the provided value.

121. The method of claim 43 wherein the providing of the identified attribute value further includes providing one or more indications of information used to generate the provided attribute value.

122. The method of claim 121 wherein the provided indications of the information used to generate the provided attribute value include ages of one or more pieces of the information.

123. The method of claim 43 wherein the provided identified attribute value has an uncertainty that is based at least in part on the age of the value.

124. The method of claim 123 wherein the uncertainty of the value based on the age is determined based upon a table.

125. The method of claim 123 wherein the uncertainty of the value based on the age is determined based upon a functional relationship.

126. The method of claim 123 wherein the uncertainty of the value based on the age is determined based upon historical data.

127. The method of claim 123 wherein the uncertainty of the value based on the age is determined based upon a defined mechanism.

128. The method of claim 127 wherein the defined mechanism is received from the requesting attribute consumer.

129. The method of claim 127 wherein the method is performed by a characterization module executing on the computing device, and wherein the defined mechanism is provided by the characterization module.

130. The method of claim 43 wherein the providing of the identified attribute value further includes providing information as to how the maximum age was determined.

131. A method in a computing device for exchanging context attributes, comprising:

receiving an invocation request to provide an attribute value, the invocation request being generated by a requesting attribute consumer and identifying the attribute whose value is to be provided, the identified attribute having a source such that a value of the identified attribute previously obtained from the source is cached with an indication of the age of the previously-obtained value of the identified attribute; and in response to receiving the invocation request, providing a value for the identified attribute to the requesting attribute consumer by,
  determining whether the age of the previously-obtained value of the identified attribute exceeds the specified maximum age;
  if the age of the previously-obtained value of the identified attribute does not exceed the specified maximum age, providing the previously-obtained value of the identified attribute to the requesting attribute consumer; and
  if the age of the previously-obtained value of the identified attribute exceeds the specified maximum age:
    obtaining a new value of the identified attribute from the source of the identified attribute,
    determining that the new value of the identified attribute exceeds the specified maximum age, and
    in response to determining that the new value of the identified attribute exceeds the specified maximum age, generating an error condition indicating that the source is unable to satisfy the specified maximum age.

132. A method in a computing device for exchanging context attributes, comprising:

receiving an invocation request to provide an attribute value, the invocation request being generated by a requesting attribute consumer and identifying the attribute whose value is to be provided, the invocation request further specifying a basis for determining one of a plurality of values of the identified attribute that are available from different sources to provide such that the oldest available value of the identified attribute is to be selected; and in response to receiving the invocation request, providing a value for the identified attribute to the requesting attribute consumer that is determined from the plurality of available values of the identified attribute using the specified basis such that the provided value is the oldest available value of the identified attribute.

133. A method in a computing device for exchanging context attributes, comprising:

receiving an invocation request to provide an attribute value, the invocation request being generated by a requesting attribute consumer and identifying the attribute whose value is to be provided, the invocation request further specifying a basis for determining one of a plurality of values of the identified attribute that are available from different sources to provide such that the available value of the identified attribute having a lowest uncertainty level is to be selected; and in response to receiving the invocation request, providing a value for the identified attribute to the requesting attribute consumer that is determined from the plurality of available values of the identified attribute using the specified basis such that the provided value is the available value of the identified attribute having the lowest uncertainty level.

134. A method in a computing device for exchanging context attributes, comprising:

receiving an invocation request to provide an attribute value, the invocation request being generated by a requesting attribute consumer and identifying the attribute whose value is to be provided, the invocation request further specifying a basis for determining a value of the identified attribute to provide that is an average of a plurality of values of the identified attribute that are available from different sources; and in response to receiving the invocation request, providing a value for the identified attribute to the requesting attribute consumer that is determined from the plurality of available values of the identified attribute using the specified basis such that the provided value is the average of the available values of the identified attribute.

135. A method in a computing device for exchanging context attributes, comprising:

receiving an invocation request to provide an attribute value, the invocation request being generated by a requesting attribute consumer and identifying the attribute whose value is to be provided, each of a plurality of values of the identified attribute that are available from different sources having an uncertainty level, the invocation request further specifying a basis for determining a value of the identified attribute to provide based at least in part on uncertainty level, and in response to receiving the invocation request, providing a value for the identified attribute to the requesting attribute consumer that is determined from the plurality of available values of the identified attribute using the specified basis such that the provided value is the average of the available values of the identified attribute, weighted by their uncertainty levels.

136. A method in a computing device for exchanging context attributes, comprising:

receiving an invocation request to provide an attribute value, the invocation request being generated by a requesting attribute consumer and identifying the attribute whose value is to be provided, each of a plurality of values of the identified attribute that are available from different sources having an age, the invocation request further specifying a basis for determining a value of the identified attribute to provide based at least in part on age; and in response to receiving the invocation request, providing a value for the identified attribute to the requesting attribute consumer that is determined from the plurality of available values of the identified attribute using the specified basis such that the provided value is the average of the available values of the identified attribute, weighted by their ages.

137. A method in a computing device for exchanging context attributes, comprising:

receiving an invocation request to provide an attribute value, the invocation request being generated by a requesting attribute consumer and identifying the attribute whose value is to be provided, the invocation request further specifying a basis for determining one of a plurality of values of the identified attribute that are available from different sources to provide such that the available value of the identified attribute that occurs the largest number of times among the available values of the identified attribute is to be selected; and in response to receiving the invocation request, providing a value for the identified attribute to the requesting attribute consumer that is determined from the plurality of available values of the identified attribute using the specified basis such that the provided value is the available value of the identified attribute that occurs the largest number of times among the available values of the identified attribute.

138. A method in a computing device for exchanging context attributes, comprising:

receiving an invocation request to provide an attribute value, the invocation request being generated by a requesting attribute consumer and identifying the attribute whose value is to be provided, each of a plurality of values of the identified attribute that are available from different sources having an uncertainty level and an effective time, the invocation request further specifying a basis for selecting an available value of the identified attribute based upon a function of the uncertainty level and effective time of each; and in response to receiving the invocation request, providing a value for the identified attribute to the requesting attribute consumer that is determined from the plurality of available values of the identified attribute using the specified basis such that the provided value is selected from the available values of the identified attribute based upon the function of the uncertainty level and effective time of each.

139. A computing device for exchanging context attributes, comprising:

an invocation request receiver that receives an invocation request to provide an attribute value, the invocation request being generated by a requesting attribute consumer and identifying the attribute whose value is to be provided and specifying a basis for determining one of a plurality of values of the identified attribute that are available from different sources such that a newest available value of the identified attribute is to be selected; and an attribute value provider that provides a value for the identified attribute to the requesting attribute consumer in response to receipt of the invocation request by the invocation request receiver the value provided being determined from the plurality of available values of the identified attribute using the specified basis such that the provided value is the newest available value of the identified attribute.

140. The computing device of claim 139 wherein the computing device is a mobile computing device.

141. The computing device of claim 139 wherein the computing device is a wearable computing device worn on the body of a human user.

142. The computing device of claim 139 further comprising an attribute value memory that contains a value of the identified attribute, wherein the attribute value contained in the attribute value memory is provided to the requesting attribute consumer by the attribute value provider.

143. The computing device of claim 139 wherein the identified attribute is associated with an attribute source, the computing device further comprising an attribute procurement subsystem that obtains a value of the identified attribute from the attribute source with which the identified attribute is associated, and wherein the value of the attribute obtained from the attribute source with which the identified attribute is provided to the requesting attribute consumer by the attribute value provider.

144. The computing device of claim 139 wherein a value of the identified attribute is available from each of a plurality of sources, and wherein the invocation request further specifies one of the plurality of sources from which a value of the identified attribute is available, and wherein the value of the identified attribute provided to the requesting attribute consumer by the attribute value provider is from the specified source.

145. The computing device of claim 139 wherein a value of the identified attribute is available from each of a plurality of sources, and wherein the invocation request further specifies to provide a value of the identified attribute from each of the sources from which a value of the identified attribute is available, and wherein a value of the identified attribute from each of the sources from which a value of the identified attribute is available is provided to the requesting attribute consumer by the attribute value provider.

146. The computing device of claim 139 wherein a value of the identified attribute is available from each of a plurality of sources, and wherein the value of the identified attribute provided to the requesting attribute consumer is determined based upon the plurality of values of the identified attribute available from different sources.

147. The computing device of claim 139 wherein a plurality of values of the identified attribute are available from different sources, and wherein the value of the identified attribute provided to the requesting attribute consumer by the attribute value provider is selected from the plurality of available values of the identified attribute.

148. The computing device of claim 139 wherein a plurality of values of the identified attribute are available from different sources, and wherein the value of the identified attribute provided to the requesting attribute consumer by the attribute value provider is based upon the plurality of available values of the identified attribute but different from each of the plurality of available values of the identified attribute.

149. A computing device for exchanging context attributes, comprising:

an invocation request receiver that receives an invocation request to provide an attribute value, the invocation request being generated by a requesting attribute consumer, the invocation request identifying the attribute whose value is to be provided, the identified attribute having a source and a value of the identified attribute previously obtained from the source being cached with an indication of the age of the previously-obtained value of the identified attribute;

an age determination subsystem that determines whether the age of the previously-obtained value of the identified attribute exceeds a specified maximum age in response to receipt of the invocation request by the invocation request receiver; and an attribute value provider that provides a value for the identified attribute to the requesting attribute consumer in response to receipt of the invocation request by the invocation request receiver in such a manner that the previously-obtained value of the identified attribute is provided if its age does not exceed the specified maximum age and in such a manner that a new value of the identified attribute that is obtained from the source is provided if the age of the previously-obtained value of the identified attribute exceeds the specified maximum age.

150. A computer-readable medium whose contents cause a computing device to exchange context attributes, by performing a method comprising:

receiving an invocation request to provide an attribute value, the invocation request from a requesting attribute consumer and specifying a basis for determining one of a plurality of values of an identified attribute that are available from different sources such that a newest available value of the identified attribute is to be selected; and in response to receiving the invocation request, providing a value for the identified to the requesting attribute consumer that is determined from the plurality of available values of the identified attribute using the specified basis such that the provided value is the newest available value of the identified attribute.

151. A method in a computing device for exchanging context attributes, comprising:

receiving an invocation request to register an attribute, the invocation request being generated by an attribute source, the invocation request identifying the attribute to be registered and further specifying a manner of invoking the attribute source to obtain the identified attribute from the attribute source;

in response to receiving the invocation request, generating an indication that the identified attribute can be obtained from the attribute source, the generated indication including an indication of the specified manner of invoking the attribute source to obtain the identified attribute from the attribute source;

invoking the attribute source in the specified manner to obtain the identified attribute from the attribute source; and in response to invocation of the attribute source, receiving the identified attribute from the attribute source so as to receive a value of the attribute and an indication of the time at which the value of the attribute is most accurate.

152. The method of claim 151 wherein invoking the attribute source to obtain the identified attribute from the attribute source includes an identification of the attribute.

153. The method of claim 151 wherein the receiving of the identified attribute from the attribute source includes receiving an indication of a level of uncertainty of the value of the attribute.

154. The method of claim 151 further comprising:
receiving an invocation request to provide an attribute value, the invocation request to provide an attribute value identifying the attribute identified by the invocation request to register an attribute, the invocation request to provide an attribute value being generated by a requesting attribute consumer; and
in response to receiving the invocation request to provide an attribute value:
using the generated indication of the specified manner of invoking the attribute source to obtain the identified attribute from the attribute source to invoke the attribute source to obtain the identified attribute from the attribute source, and
providing the attribute value obtained from the attribute source to the requesting attribute consumer.

155. The method of claim 151, wherein the invocation request further specifies a name of the attribute, and wherein the generated indication that the identified attribute can be obtained from the attribute source includes an indication of the specified name of the attribute.

156. The method of claim 151, wherein the invocation request further specifies a name of the attribute source, and wherein the generated indication that the identified attribute can be obtained from the attribute source includes an indication of the specified name of the attribute source.

157. The method of claim 151, wherein the invocation request further specifies a data type of the attribute, and wherein the generated indication that the identified attribute can be obtained from the attribute source includes an indication of the specified data type of the attribute.

158. The method of claim 151, wherein the invocation request further specifies an indication of a format of the attribute, and wherein the generated indication that the identified attribute can be obtained from the attribute source includes an indication of the specified format indication of the attribute.

159. A method in a computing device for exchanging context attributes, comprising:
receiving an invocation request to register an attribute, the invocation request being generated by an attribute source, the invocation request identifying the attribute to be registered and further specifying a manner of invoking the attribute source to obtain the identified attribute from the attribute source;
in response to receiving the invocation request, generating an indication that the identified attribute can be obtained from the attribute source, the generated indication including an indication of the specified manner of invoking the attribute source to obtain the identified attribute from the attribute source; and
invoking the attribute source in the specified manner to obtain the identified attribute from the attribute source, wherein the invoking includes an indication of a maximum time in which the attribute source is expected to supply the identified attribute.

160. A method in a computing device for exchanging context attributes, comprising:
receiving an invocation request to register an attribute, the invocation request being generated by an attribute source, the invocation request identifying the attribute to be registered and further specifying a manner of invoking the attribute source to obtain the identified attribute from the attribute source;
in response to receiving the invocation request, generating an indication that the identified attribute can be obtained from the attribute source, the generated indication including an indication of the specified manner of invoking the attribute source to obtain the identified attribute from the attribute source; and
invoking the attribute source in the specified manner to obtain the identified attribute from the attribute source;
in response to invocation of the attribute source, receiving the identified attribute from the attribute source so as to receive a value of the attribute and an indication of units in which the value of the attribute is expressed.

161. A method in a computing device for exchanging context attributes, comprising:
receiving an invocation request to register an attribute, the invocation request being generated by an attribute source, the invocation request identifying the attribute to be registered and further specifying a manner of invoking the attribute source to obtain the identified attribute from the attribute source;
in response to receiving the invocation request, generating an indication that the identified attribute can be obtained from the attribute source, the generated indication including an indication of the specified manner of invoking the attribute source to obtain the identified attribute from the attribute source; and
invoking the attribute source in the specified manner to obtain the identified attribute from the attribute source;
in response to invocation of the attribute source, receiving the identified attribute from the attribute source so as to receive a value of the attribute and an indication of a format in which the value of the attribute is expressed.

162. A computer-readable medium whose contents cause a computing device to exchange context attributes, by performing a method comprising:
receiving an invocation request to register an attribute, the invocation request being generated by an attribute source, the invocation request identifying the attribute to be registered and further specifying a manner of invoking the attribute source to obtain the identified attribute from the attribute source;
in response to receiving the invocation request, generating an indication that the identified attribute can be obtained from the attribute source, the generated indication including an indication of the specified manner of invoking the attribute source to obtain the identified attribute from the attribute source;
invoking the attribute source in the specified manner to obtain the identified attribute from the attribute source; and
in response to invocation of the attribute source, receiving the identified attribute from the attribute source so as to receive a value of the attribute and an indication of the time at which the value of the attribute is most accurate.

163. The computer-readable medium of claim 162 wherein Invoking the attribute source to obtain the identified attribute from the attribute source includes an identification of the attribute.

164. The computer-readable medium of claim 162 wherein the contents of the computer-readable medium further cause the computing device to:
receive an invocation request to provide an attribute value, the invocation request to provide an attribute value identifying the attribute identified by the invocation request to register an attribute, the invocation request to provide an attribute value being generated by a requesting attribute consumer; and in response to receiving the invocation request to provide an attribute value:

using the generated indication of the specified manner of invoking the attribute source to obtain the identified attribute from the attribute source to invoke the attribute source to obtain the identified attribute from the attribute source, and providing the attribute value obtained from the attribute source to the requesting attribute consumer.

165. A computer-readable medium whose contents cause a computing device to exchange context attributes, by performing a method comprising:

receiving an invocation request from an attribute consumer to provide one or more values of an identified attribute, the identified attribute having a source such that one or more previously obtained values of the identified attribute from the source each have an associated age; and in response, providing to the attribute consumer at least one value for the identified attribute by, determining whether the ace of a previously-obtained value of the identified attribute exceeds age;

if the age of the previously-obtained value of the identified attribute does not exceed the specified maximum age, providing the previously-obtained value of the identified attribute to the attribute consumer; and if the age of the previously-obtained value of the identified attribute does exceed the specified maximum age:

obtaining a new value of the identified attribute from the source of the identified attribute, and providing the new value of the identified attribute to the attribute consumer.

166. The computer-readable medium of claim 165 wherein the contents are instructions that when executed cause the computing device to perform the method.

167. A computing device for exchanging context attributes, comprising:

an invocation request receiver configured to receive an invocation request from an attribute consumer to provide one or more values of an identified attribute, the invocation request identifying an attribute having a source such that one or more values of the identified attribute from the source each have an associated age; and an attribute value provider configured to provide to the attribute consumer in response at least one value for the identified attribute by, determining whether the age of a previously-obtained value of the identified attribute exceeds a specified maximum age;

if the ace of the previously-obtained value of the identified attribute does not exceed the specified maximum age, providing the previously-obtained value of the identified attribute to the attribute consumer; and if the age of the previously-obtained value of the identified attribute does exceed the specified maximum age:

obtaining a new value of the identified attribute from the source of the identified attribute, and providing the new value of the identified attribute to the attribute consumer.

168. The computing device of claim 167 wherein the invocation request receiver and the attribute value provider are part of a characterization module executing in memory of the computing device.

* * * * *

UNITED STATES PATENT AND TRADEMARK OFFICE
CERTIFICATE OF CORRECTION

PATENT NO. : 6,920,616 B1
DATED : July 19, 2005
INVENTOR(S) : Kenneth H. Abbott et al.

It is certified that error appears in the above-identified patent and that said Letters Patent is hereby corrected as shown below:

Column 26,
Line 20, "determining; from" should read as -- determining, from --.

Column 27,
Line 14, "vale" should read as -- value --.
Line 16, "previously obtained value; and" should read as -- previously obtained from the source is cached with an indication of an age of the previously-obtained value; and --.

Column 32,
Line 12, claim 124 should read as -- The method of claim 1, further comprising the step of, in response to receiving the invocation request, providing a name and a value of a property associated with the identified attribute to the requesting attribute consumer. --.

Column 36,
Line 39, "identified to" should read as -- identified attribute to --.

Column 38,
Line 60, "Invoking" should read as -- invoking --.

Signed and Sealed this

Twenty-second Day of November, 2005

JON W. DUDAS
*Director of the United States Patent and Trademark Office*